(12) United States Patent
Peng et al.

(10) Patent No.: US 10,752,771 B2
(45) Date of Patent: Aug. 25, 2020

(54) LOW DIELECTRIC CONSTANT (DK) AND DISSIPATION FACTOR (DF) MATERIAL FOR NANO-MOLDING TECHNOLOGY (NMT)

(71) Applicant: SABIC GLOBAL TECHNOLOGIES B.V., Bergen op Zoom (NL)

(72) Inventors: Hui Peng, Shanghai (CN); Bing Guan, Shanghai (CN); Wei Shan, Shanghai (CN)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/627,409

(22) PCT Filed: Dec. 28, 2018

(86) PCT No.: PCT/IB2018/060704
§ 371 (c)(1),
(2) Date: Dec. 30, 2019

(87) PCT Pub. No.: WO2019/130269
PCT Pub. Date: Jul. 4, 2019

(65) Prior Publication Data
US 2020/0140679 A1  May 7, 2020

Related U.S. Application Data

(60) Provisional application No. 62/611,616, filed on Dec. 29, 2017.

(51) Int. Cl.
| | |
|---|---|
| C08L 67/02 | (2006.01) |
| B29C 45/00 | (2006.01) |
| H01Q 1/36 | (2006.01) |
| C08J 5/04 | (2006.01) |
| B29C 45/14 | (2006.01) |
| B29K 67/00 | (2006.01) |
| B29K 309/08 | (2006.01) |
| B29L 31/34 | (2006.01) |

(52) U.S. Cl.
CPC .......... *C08L 67/02* (2013.01); *B29C 45/0001* (2013.01); *B29C 45/14311* (2013.01); *C08J 5/043* (2013.01); *H01Q 1/36* (2013.01); *B29C 2045/14868* (2013.01); *B29K 2067/003* (2013.01); *B29K 2309/08* (2013.01); *B29K 2995/0006* (2013.01); *B29L 2031/3456* (2013.01); *C08J 2367/02* (2013.01); *C08J 2423/08* (2013.01); *C08J 2433/12* (2013.01); *C08J 2433/14* (2013.01); *C08J 2453/02* (2013.01); *C08J 2467/02* (2013.01); *C08J 2469/00* (2013.01); *C08J 2483/04* (2013.01); *C08L 2205/025* (2013.01); *C08L 2205/03* (2013.01); *C08L 2205/035* (2013.01); *C08L 2207/20* (2013.01)

(58) Field of Classification Search
CPC .............. C08L 67/02; C08L 2205/025; C08L 2205/03; C08L 2205/035; C08L 2207/20; B29C 45/14311; B29C 45/0001; H01Q 1/36; C08J 5/043; C08J 2367/02; C08J 2467/02; C08J 2433/12; C08J 2433/14; C08J 2453/02; C08J 2469/00; C08J 2483/04; B29L 2031/3456
USPC ....................................................... 524/505
See application file for complete search history.

(56) References Cited

U.S. PATENT DOCUMENTS

| | | | |
|---|---|---|---|
| 9,284,449 B2 * | 3/2016 | Sun ...................... | C08L 23/0884 |
| 2012/0246873 A1 * | 10/2012 | Konduri .............. | B29C 45/1704 |
| | | | 16/110.1 |
| 2015/0368458 A1 | 12/2015 | Sun et al. | |
| 2017/0029615 A1 * | 2/2017 | He .......................... | C08L 69/00 |

FOREIGN PATENT DOCUMENTS

| | | | |
|---|---|---|---|
| CN | 102863152 A | | 1/2013 |
| CN | 104845297 A | * | 8/2015 |
| CN | 104845297 A | | 8/2015 |
| CN | 104937018 A | | 9/2015 |
| CN | 105385121 A | * | 3/2016 |
| CN | 105385121 A | | 3/2016 |
| CN | 107459805 A | * | 12/2017 |
| CN | 107459805 A | | 12/2017 |
| JP | H07-041659 A | | 2/1995 |
| JP | H09-221338 A | | 8/1997 |
| JP | 2016-033209 A | | 3/2016 |
| JP | 2017-057258 A | | 3/2017 |
| WO | WO 2017/115757 A1 | | 7/2017 |
| WO | 2017/203467 A1 | | 11/2017 |

OTHER PUBLICATIONS

Database WPI, Week 201808, Thomson Scientific, London, GB: AN 2017-862044, XP002790204.
Database WPI, Week 201618, Thomson Scientific, London, GB: AN 2015-61319Y, XP002790205.
Database WPI, Week 201649, Thomson Scientific, London, GB: AN 2016-18088Y, XP002790206.

* cited by examiner

*Primary Examiner* — Michael Bernshteyn
(74) *Attorney, Agent, or Firm* — BakerHostetler

(57) ABSTRACT

The disclosure concerns thermoplastic resin compositions including a polymer resin, a dielectric glass fiber component, a hollow glass fiber, and an impact modifier.

18 Claims, 7 Drawing Sheets

Table 1. Components of the Composition

| Item | Description | Supplier and trade name |
|---|---|---|
| PBT$_{low}$ | Polybutylene terephthalate, low viscosity (740-900 Poise), MW from 8,000 to 40,000 Daltons | SABIC, PBT 195 |
| PBT$_{high}$ | PBT, high Viscosity (7500-9500 Poise), MW from 80,000 to 120,000 Daltons | SABIC, PBT 315 |
| IM | Ethylene-methyl acrylate glycidyl methacrylate terpolymer; impact modifier | Arkema Inc., LOTADER® AX 8900 |
| POLY1 | low intrinsic viscosity polyethylene terephthalate, IV 0.555 to about 0.575 dl/g | Dupond, PET Crystar® 3947 |
| POLY2 | Post-consumer recycled PET, IV: 0.6~0.68 dl/g | TAKAYASU Co. Ltd, POLYESTER CHIP |
| POLY3 | Polymer resin from resorcinol, bisphenol A, p-cumylphenol, DAC, and phosgene, SLX 90/10 PCP capped 20M powder | SABIC ITR 9010 |
| POLY4 | Siloxane resin, Resin, EXL, Opaque PC-Siloxane copolymer, 20% Siloxane | SABIC C9030P |
| POLY5 | Siloxane resin, Resin, EXL, Opaque PC-Siloxane copolymer, 60% Siloxane | SABIC |
| DkPOLY1 | General purpose polystyrene (GPPS); low Dk polymer resin; Dk about 2.55 | Styron, 680A |
| Dk/Df GF | low Dk/Df GF; Dk about 4.5, Df about 0.0007 | CPIC, ECS(HL)303 |
| GF$_{flat}$ | flat glass fiber | Nittobo, CSG 3PA-830S |
| HGS1 | hollow glass sphere; density 0.46g/cm$^3$, diameter is ~20 um | 3M, iM16K |
| HGS2 | hollow glass sphere; density 0.6g/cm$^3$, diameter is about 30 um | 3M, S60HS |
| DkPOLY | High molecular weight polypropylene; low Dk polymer resin | SABIC, PP500P |
| DkPOLY2 | Polytetrafluoroethylene; low Dk polymer resin | KITAMURA, KT 300M |
| IM2 | styrene-ethylene-butylene-styrene (SEBS) polymer | Kraton, G1651 |
| IM3 | Ethylene-Methyl Acrylate Copolymer | Elvaloy 1125AC |
| DkPOLY3 | Homo polypropylene polymer; low Dk polymer resin | SABIC, 570P |
| COMP | Styrene-acrylate-epoxy oligomer; compatibilizer | BASF, Joncryl ADR 4368-F |
| STAB | Monozinc phosphate; MZP Z21-82 | BUDENHEIM IBERICA, S.L. Soc. en Comandita, |
| AOX1 | Pentaerythritol betalaurylthiopropionate | Rionlon Chemicals, Thanox 412S |
| AOX2 | pentaerythritol- tetrakis(3-(3,5-di-tert.butyl-4-hydroxy-phenyl-)propionate) | BASF, Irgafos®168 |
| PETS | PENTAERYTHRITOL TETRASTEARATE | Lonza Inc., GYLCOLUB P(TM) |
| STAB2 | Phosphorous acid ester, PEPQ Powder | Clariant, Hostanox P-EPQ |
| CB | Carbon black M900; colorant | CABOT, Monarch® 900 |

FIG. 1

Table 2A. Formulations for samples C1 through Ex15.

| Item | C1 | C2 | C3 | C4 | C5 | C6 | C7 | C8 | C9 | Ex 10 | Ex 11 | Ex 12 | Ex 13 | Ex 14 | Ex 15 |
|---|---|---|---|---|---|---|---|---|---|---|---|---|---|---|---|
| $PBT_{low}$ | 5.5 | 5.5 | 5.5 | 5.5 | 73.05 | 24.8 | 24.8 | 27.5 | 32.5 | 30 | 30 | 45 | 47.5 | 57.5 | 57.5 |
| $PBT_{high}$ | 45 | 45 | 54 | 64 | | | | | | 5.5 | 5.5 | 5.4 | 5.5 | 5.5 | 5.5 |
| IM | | | | | | 3 | | | | | | | 1.5 | 1.5 | 1.5 |
| POLY1 | 19 | 19 | | | | | | | | | | | | | |
| POLY2 | | | 10 | | | 25 | 22 | 26.9 | 31.9 | 34 | 34 | | | | |
| POLY3 | | | | | | | | | | | | | 19 | | |
| POLY4 | | | | | | | | | | | | | | | |
| POLY5 | | | | | | | | | | | | | | | |
| DkPOLY1 | | | | | 25 | | | | | | | | | | |
| Dk/df GF | | 30 | 30 | 30 | | 20 | 20 | 20 | 20 | | 15 | | 20 | 15 | 15 |
| $GF_{flat}$ | 30 | | | | | | | | | | | | | | |
| HGS1 | | | | | | | | | | | | | | | 15 |
| HGS2 | | | | | | | | | | 30 | 15 | 30 | 20 | 15 | |
| DkPOLY | | | | | | | | 30 | | | | | | | |
| DkPOLY2 | | | | | 30 | | | | | | | | | | |
| IM2 | | | | | | | | 5 | 5 | | | | 5 | 5 | 5 |
| IM3 | | | | | | | | | | | | | | | |
| DkPOLY3 | | | | | | | | 20 | 10 | | | | | | |
| COMP | | | | | 1.5 | | | | | | | | | | |
| STAB | | | | | | | | | | | | | 0.1 | | |
| AOX1 | | | | | | | | 0.1 | 0.1 | | | | | | |
| AOX2 | 0.1 | 0.1 | 0.1 | 0.1 | 0.3 | 0.1 | 0.1 | 0.1 | 0.1 | 0.1 | 0.1 | 0.1 | 0.1 | 0.1 | 0.1 |
| PETS | 0.3 | 0.3 | 0.3 | 0.3 | | | | 0.3 | 0.3 | 0.3 | 0.3 | 0.3 | 0.3 | 0.3 | 0.3 |
| STAB2 | 0.1 | 0.1 | 0.1 | 0.1 | 0.15 | 0.1 | 0.1 | 0.1 | 0.1 | 0.1 | 0.1 | 0.1 | 0.1 | 0.1 | 0.1 |
| CB | | | | | | | | | | | | | | | |

FIG. 2

Table 2B. Formulations for samples C1 through Ex15.

| Item | Ex 16 | Ex 17 | Ex 18 | Ex 19 | Ex 20 | Ex 21 | Ex 22 | Ex 23 | Ex 24 | Ex 25 | Ex 26 | Ex 27 | Ex 28 | Ex 29 |
|---|---|---|---|---|---|---|---|---|---|---|---|---|---|---|
| PBT$_{low}$ | 47.6 | 47 | 60 | 34.5 |  | 23 | 19.4 |  |  | 26.7 |  | 29.5 | 27.5 | 29.5 |
| PBT$_{high}$ | 5.5 | 5.5 | 33.5 |  | 30.5 | 22.4 | 19 | 23 | 26.7 | 26.7 | 30.25 | 28 | 27 | 28 |
| IM | 1.5 | 2 |  |  | 3 | 3 | 3 | 3 | 2 | 2 | 2 | 3 | 3 | 3 |
| POLY1 |  |  |  |  |  |  |  |  |  |  |  |  |  |  |
| POLY2 |  |  |  |  | 30 |  |  | 22.4 | 26.7 |  | 30.2 |  |  |  |
| POLY3 |  |  |  |  |  | 15 |  |  |  |  |  |  |  |  |
| POLY4 |  |  |  |  |  |  | 12 | 15 | 10 | 10 |  |  |  |  |
| POLY5 |  |  |  |  |  |  |  |  |  |  | 3 |  | 6 |  |
| DkPOLY1 |  |  |  |  |  |  |  |  |  |  |  |  |  |  |
| Dk/df GF | 30 | 32.5 |  | 50 | 15 | 15 | 20 | 15 | 15 | 15 | 15 | 18 | 18 | 18 |
| GF$_{flat}$ |  |  |  |  |  |  |  |  |  |  |  |  |  |  |
| HGS1 |  |  |  |  |  |  |  |  |  |  |  | 14 |  |  |
| HGS2 | 10 | 7.5 | 6 | 15 | 15 | 15 | 20 | 15 | 15 | 15 | 15 |  | 14 | 14 |
| DkPOLY |  |  |  |  |  |  |  |  |  |  |  |  |  |  |
| DkPOLY2 |  |  |  |  |  |  |  |  |  |  |  |  |  |  |
| IM2 | 5 | 5 |  |  | 6 | 6 | 6 | 6 | 4 | 4 | 4 | 7 | 4 | 4 |
| IM3 |  |  |  |  |  |  |  |  |  |  |  |  |  | 3 |
| DkPOLY3 |  |  |  |  |  |  |  |  |  |  |  |  |  |  |
| COMP |  |  |  |  |  |  |  |  |  |  |  |  |  |  |
| STAB |  |  |  |  |  | 0.1 | 0.1 | 0.1 | 0.1 | 0.1 | 0.1 |  |  |  |
| AOX1 |  |  |  |  |  |  |  |  |  |  |  |  |  |  |
| AOX2 | 0.1 | 0.1 | 0.1 | 0.1 | 0.1 | 0.1 | 0.1 | 0.1 | 0.1 | 0.1 | 0.1 | 0.1 | 0.1 | 0.1 |
| PETS | 0.2 | 0.3 | 0.3 | 0.3 | 0.3 | 0.3 | 0.3 | 0.3 | 0.3 | 0.3 | 0.3 | 0.3 | 0.3 | 0.3 |
| STAB2 | 0.1 | 0.1 | 0.1 | 0.1 | 0.1 | 0.1 | 0.1 | 0.1 | 0.1 | 0.1 | 0.1 | 0.1 | 0.1 | 0.1 |
| CB | 0.5 | 0.5 |  |  |  |  |  |  |  |  |  |  |  |  |

FIG. 3

Table 5A. Properties of samples C1 through Ex15

| Test and Test Conditions | | C1 | C2 | C3 | C4 | C5 | C6 | C7 | C8 | C9 | Ex 10 | Ex 11 | Ex 12 | Ex 13 | Ex 14 | C1 |
|---|---|---|---|---|---|---|---|---|---|---|---|---|---|---|---|---|
| MVR/ISO 275 °C, 5kg/ 300s (10 cm³/min) | | 45 | 47 | 25 | 42 | 8 | 6 | 3 | 62 | 66 | 129 | 79 | 47 | 7 | 25 | 28 |
| Tensile /ASTM | Mod. (MPa) | 10197 | 8818 | 8750 | 8482 | n/a | n/a | n/a | n/a | n/a | n/a | n/a | n/a | n/a | n/a | n/a |
| | Stress at break (MPa) | 145 | 134 | 132 | 130 | n/a | n/a | n/a | n/a | n/a | n/a | n/a | n/a | n/a | n/a | n/a |
| | Elong. At brk (%) | 2.6 | 3.0 | 3.1 | 3.3 | n/a | n/a | n/a | n/a | n/a | n/a | n/a | n/a | n/a | n/a | n/a |
| Tensile /ISO | Mod. (MPa) | n/a | n/a | n/a | n/a | 2809 | 7306 | 5484 | 5345 | 5675 | 3917 | 6340 | 3393 | 6780 | 5436 | 5398 |
| | Stress at brk (MPa) | n/a | n/a | n/a | n/a | 53 | 103 | 78 | 78 | 96 | 47 | 95 | 55 | 81 | 81 | 83 |
| | Elong. At brk (%) | n/a | n/a | n/a | n/a | 2.5 | 2.6 | 2.6 | 2.6 | 3.1 | 1.3 | 2.1 | 2.7 | 2.1 | 2.8 | 2.9 |
| Flexural /ASTM | Mod. (MPa) | 8890 | 8180 | 8160 | 7890 | n/a | n/a | n/a | n/a | n/a | n/a | n/a | n/a | n/a | n/a | n/a |
| | Stress at brk (MPa) | 218 | 201 | 199 | 198 | n/a | n/a | n/a | n/a | n/a | n/a | n/a | n/a | n/a | n/a | n/a |
| Flexural /ISO | Mod. (MPa) | n/a | n/a | n/a | n/a | 2767 | 6310 | 4798 | 5197 | 5372 | 3857 | 6215 | 3248 | 6055 | 4902 | 4862 |
| | Stress at brk (MPa) | n/a | n/a | n/a | n/a | 95 | 156 | 116 | 130 | 152 | 65 | 144 | 84 | 129 | 127 | 129 |
| Izod/ ASTM | N, 23 °C/5 (J/m) | 109 | 103 | 114 | 113 | n/a | n/a | n/a | n/a | n/a | n/a | n/a | n/a | 87 | 78 | 79 |
| | Un-notched, 23 °C/5 (J/m) | 886 | 1040 | 964 | 1020 | n/a | n/a | n/a | n/a | n/a | n/a | n/a | n/a | 559 | 654 | 693 |
| Izod/ ISO | N, 23 °C/5 (kJ/m2) | n/a | n/a | n/a | n/a | 2.4 | 8.2 | 9.3 | 9.9 | 10.6 | 1.9 | 5.7 | 2.0 | 8.3 | 7.9 | 7.7 |
| | Un-notched, 23 °C/5 (kJ/m2) | n/a | n/a | n/a | n/a | 17.4 | 49.8 | 31.1 | 35.1 | 58.0 | 12.0 | 25.2 | 19.2 | 34.6 | 38.4 | 39.4 |
| HDT/ ASTM | 1.82 Mpa (°C) | 207 | 205 | 206 | 208 | n/a | n/a | n/a | n/a | n/a | n/a | n/a | n/a | n/a | n/a | n/a |
| HDT/ ISO | 1.8 MPa (°C) | n/a | n/a | n/a | n/a | 82 | 199 | 149 | 161 | 170 | 65 | 182 | 57 | 206 | 200 | 203 |
| Bond Strength | "T" (MPa) | n/a | n/a | 30.2 | 28.0 | 2.1 | n/a | n/a | 4.8 | 6.0 | 14.5 | 11.5 | 18.8 | 25.1 | 25.8 | 25.8 |
| | "TRI" (MPa) | n/a | n/a | n/a | n/a | 2.7 | n/a | n/a | 5.5 | 10.5 | 24.7 | 32.4 | 33.0 | n/a | n/a | n/a |
| Dk | 1.1 GHz | 3.55 | 3.22 | 3.237 | 3.217 | n/a | n/a | n/a | n/a | n/a | n/a | n/a | n/a | n/a | n/a | n/a |
| Dk | 1.9 GHz | n/a | n/a | n/a | n/a | 2.81 | 2.98 | 2.81 | 2.89 | 2.95 | 2.53 | 2.84 | 2.6 | 2.78 | 2.79 | 2.76 |
| Df | 1.1 GHz | 0.007 | 0.007 | 0.007 | 0.0066 | n/a | n/a | n/a | n/a | n/a | n/a | n/a | n/a | n/a | n/a | n/a |
| Df | 1.9 GHz | n/a | n/a | n/a | n/a | 0.006 | 0.005 | 0.006 | 0.005 | 0.006 | 0.006 | 0.006 | 0.005 | 0.007 | 0.007 | 0.007 |

FIG. 4

Table 5B. Properties of samples Ex16 through Ex29.

| Test and Test Conditions | | Ex 16 | Ex 17 | Ex 18 | Ex 19 | Ex 20 | Ex 21 | Ex 22 | Ex 23 | Ex 24 | Ex 25 | Ex 26 | Ex 27 | Ex 28 | Ex 29 |
|---|---|---|---|---|---|---|---|---|---|---|---|---|---|---|---|
| MVR/ISO 275 °C, 5kg/ 300s (10 cm³/min) | | 11 | 7 | 189 | 7 | 5 | 10 | 3 | 7 | 8 | 13 | 18 | 3 | 10 | 7 |
| Tensile /ASTM | Mod. (MPa) | n/a | n/a | n/a | n/a | n/a | n/a | n/a | n/a | n/a | n/a | n/a | n/a | n/a | n/a |
| | Stress at break (MPa) | n/a | n/a | n/a | n/a | n/a | n/a | n/a | n/a | n/a | n/a | n/a | n/a | n/a | n/a |
| | Elong.At brk (%) | n/a | n/a | n/a | n/a | n/a | n/a | n/a | n/a | n/a | n/a | n/a | n/a | n/a | n/a |
| Tensile /ISO | Mod. (MPa) | 8611 | 8940 | 2788 | 15447 | 5066 | 5282 | 6268 | 4878 | 4864 | 5010 | 5551 | 5536 | 5524 | 5521 |
| | Stress at brk (MPa) | 110 | 105 | 52 | 83 | 79 | 72 | 73 | 56 | 59 | 71 | 72 | 82 | 77 | 80 |
| | Elong.At brk (%) | 2 | 2.4 | 5.5 | 0.7 | 3.8 | 3.1 | 2.9 | 3.8 | 3.8 | 3.3 | 3.2 | 3.3 | 3.4 | 3.5 |
| Flexural/ ASTM | Mod. (MPa) | n/a | n/a | n/a | n/a | n/a | n/a | n/a | n/a | n/a | n/a | n/a | n/a | n/a | n/a |
| | Stress at brk (MPa) | n/a | n/a | n/a | n/a | n/a | n/a | n/a | n/a | n/a | n/a | n/a | n/a | n/a | n/a |
| Flexural/ ISO | Mod. (MPa) | 8133 | 7661 | 2818 | 15992 | 4471 | 4520 | 5246 | 4103 | 5005 | 4949 | 5001 | 5391 | 5268 | 5313 |
| | Stress at brk (MPa) | 172 | 166 | 91 | 144 | 127 | 118 | 121 | 97 | 105 | 121 | 118 | 137 | 125 | 127 |
| Izod/ ASTM | N,23°C/ 5 (J/m) | 105 | 102 | 29 | 44 | 106 | 71 | 97 | 155 | 159 | 90 | 99 | 105 | 137 | 123 |
| | Un-notched, 23 °C/5 (J/m) | 786 | 726 | 319 | 151 | 917 | 717 | 673 | 699 | 695 | 728 | 741 | 782 | 783 | 851 |
| Izod/ ISO | N,23°C/ 5 (kJ/m²) | 12.7 | 10.4 | 2.2 | 6.4 | 9.7 | 7.0 | 9.3 | 13.8 | 14.5 | 8.7 | 8.7 | 9.6 | 12.9 | 12.4 |
| | Un-notched, 23 °C/5 (kJ/m²) | 49.3 | 46.2 | 17.3 | 17.2 | 52.5 | 43.4 | 40.0 | 41.5 | 45.0 | 47.2 | 44.6 | 44.5 | 43.4 | 47.9 |
| HDT/ASTM 1.82 Mpa (°C) | | n/a | n/a | n/a | n/a | n/a | n/a | n/a | n/a | n/a | n/a | n/a | n/a | n/a | n/a |
| HDT/ISO 1.8 MPa (°C) | | 207 | 205 | 65 | 215 | 146 | 106 | 157 | 62 | 58 | 142 | 113 | 193 | 188 | 187 |
| Bond Strength (MPa) | "T" | n/a | n/a | n/a | n/a | 20.9 | n/a | n/a | 18.5 | 25.7 | 22.4 | 25.7 | 24.1 | 20.0 | 23.2 |
| | "TRI" | n/a | n/a | n/a | n/a | n/a | n/a | n/a | n/a | n/a | n/a | n/a | n/a | n/a | n/a |
| Dk | 1.1 GHz | n/a | n/a | n/a | n/a | n/a | n/a | n/a | n/a | n/a | n/a | n/a | n/a | n/a | n/a |
| Dk | 1.9 GHz | 3.08 | 3.17 | 2.84 | 3.61 | 2.86 | 2.8 | 2.8 | 2.81 | 2.82 | 2.81 | 2.87 | 2.8 | 2.8 | 2.82 |
| Df | 1.1 GHz | n/a | n/a | n/a | n/a | n/a | n/a | n/a | n/a | n/a | n/a | n/a | n/a | n/a | n/a |
| Df | 1.9 GHz | 0.0093 | 0.01 | 0.00668 | 0.00674 | 0.00774 | 0.00739 | 0.00747 | 0.00777 | 0.00762 | 0.00714 | 0.00708 | 0.00747 | 0.00799 | 0.00907 |

FIG. 4

Table 6. Test standards and conditions for samples.

| Test | Standard | Conditions |
|---|---|---|
| Melt Volume Rate (MVR) | ISO 1133 | At 275 °C, 5 kilograms, 300 seconds |
| Flexural Modulus/Stress at Break | ASTM D790 | 3.2 millimeters, 1.3 millimeters per minute (mm/min) |
| Flexural Modulus/Stress at Break | ISO 178 | 2mm/min |
| Tensile Modulus/Stress at Break/Elongation at Break | ASTM D638 | 5 mm/min |
| Tensile Tensile Modulus/Stress at Break/Elongation at Break | ISO 527 | 5 mm/min |
| Heat Deflection Temperature (HDT) | ASTM D648 | 1.82 megapascals (MPa), 6.4 mm |
| Heat Deflection Temperature (HDT) | ISO 75/Af | 1.8 MPa Flatwise specimen orientation (80 mm by 10 mm by 4 mm thickness) span = 64mm |
| Izod Impact Strength | ASTM D256 | Notched and un-notched, 23 °C |
| Izod Impact Strength | ISO 180/1A | Notched and un-notched, 23 °C |
| Bonding strength | ISO 19095 | Lap joint, "T" or "TRI" treatment with aluminum metal Al5052 |
| Dielectric constant, Dk Dissipation factor, Df | SABIC method | 1.1 and 1.9 GHz |

LOW DIELECTRIC CONSTANT (DK) AND DISSIPATION FACTOR (DF) MATERIAL FOR NANO-MOLDING TECHNOLOGY (NMT)

CROSS-REFERENCE TO RELATED APPLICATION

This application is the National Stage of International Application No. PCT/IB2018/060704 filed Dec. 28, 2018, which claims the benefit of U.S. Provisional Application No. 62/611,616 filed Dec. 29, 2017, the disclosures of which are incorporated herein by this reference in their entireties.

TECHNICAL FIELD

The disclosure relates to thermoplastic compositions exhibiting low dielectric constant and dissipation factors and being suitable for nano-molding technology.

BACKGROUND

Modern consumer electronics devices require certain aesthetic and performance features as the market for such devices continue to grow and develop.
Nano molding technology (NMT) has been used to achieve many of these features and refers to a process by which a plastic resin may be injected onto metal surface.
NMT processes mechanically bonds plastic to metal by etching the metal surface and injection molding the plastic components onto the etched surface. A high bonding strength between the plastic and metal is generally critical for such applications. A number of factors affect bonding strength, such as selection of metal, molding process to bond plastic to metal, treatment process on metal, and plastic resins.
Despite significant research and development efforts, there remains a need for blended thermoplastic compositions that effectively address the appropriate balance of properties required in the consumer electronics industry. These and other shortcomings of the prior art are addressed by the present disclosure.

SUMMARY

In one aspect, the present disclosure provides thermoplastic compositions comprising: from about 15 wt. % to about 80 wt. % of a polymer resin; and from about 10 wt. % to about 50 wt. % of a low dielectric constant glass fiber component, wherein the low dielectric constant glass fiber component has a Dk of less than 5.0 at a frequency of from 1 MHz to 1 GHz and a Df of less than about 0.002 at a frequency of from 1 MHz to 1 GHz; from about 3 wt. % to 40 wt. % of a hollow filler; and from about 0.1 wt. % to about 10 wt. % of an impact modifier, wherein the thermoplastic composition exhibits a dielectric constant of less than 3.2 at a frequency of 1.9 GHz when tested using a split post dielectric resonator and network analyzer on a sample size of 100 mm by 70 mm and 1.6 mm thickness; wherein the thermoplastic composition exhibits a dissipation factor Df of less than 0.01 at a frequency of 1.9 GHz when tested using a split post dielectric resonator and network analyzer on a sample size of 100 mm by 70 mm and 1.6 mm thickness, wherein the thermoplastic composition exhibits a nano-molding technology bonding strength of at least 18 MPa when tested in accordance with a bonding strength test adapted from ISO 19095 with a T treatment, wherein the thermoplastic composition exhibits a notched impact strength of at least 70 J/m when tested in accordance with ASTM D256 at 23° C., wherein the thermoplastic composition exhibits a flow rate of less than 25 cm3/10 min when tested in accordance with ISO 1133 at 275° C. at 5 kg and 300 seconds, and wherein the combined weight percent value of all components does not exceed about 100 wt. %, and all weight percent values are based on the total weight of the composition.

In another aspect, the present disclosure provides methods of forming a polymer compositions, comprising: mixing, in any order: from about 15 wt. % to about 80 wt. % of a polyalkylene terephthalate resin; and from about 10 wt. % to about 50 wt. % of a low dielectric constant (Dk)/low dissipation factor (Df) glass fiber component; from about 3 wt. % to 40 wt. % of a hollow filler; and from about 0.1 wt. % to about 10 wt. % of an impact modifier so as to form a blend; and injection molding, extruding, rotational molding, blow molding, or thermoforming the blend to form the thermoplastic article.

The present disclosure also provides methods of forming an article including the steps of molding an article from the thermoplastic composition described herein.

BRIEF DESCRIPTION OF THE DRAWINGS

The above-mentioned and other features and advantages of this disclosure, and the manner of attaining them, will become apparent and be better understood by reference to the following description of one aspect of the disclosure in conjunction with the accompanying drawings, wherein:

FIG. 1 provides Table 1, a summary of the components of compositions according to one aspect of the present disclosure.

FIG. 2 provides Table 2A, formulations for samples C1-C9 and Ex 10-Ex15.

FIG. 3 provides Table 2B, formulations for samples Ex 16-Ex29.

FIG. 4 provides Tables 5A and 5B, properties for the samples of Tables 2A and 2B.

FIG. 6 provides Table 6, test standards and conditions for the samples.

DETAILED DESCRIPTION

Figure 5A:
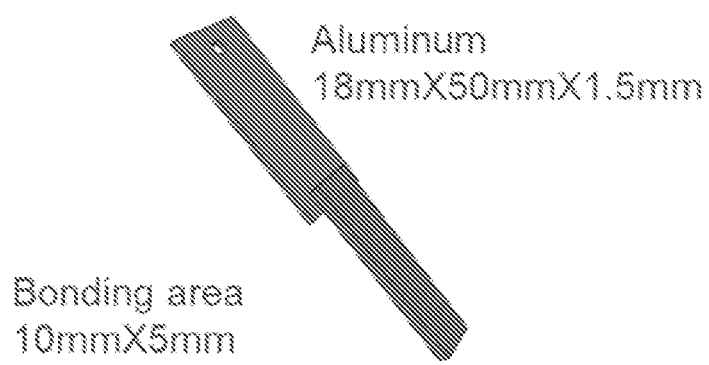
FIG. 5A is a diagram of a top lap joint injection molding part according to aspects of the dislosure.

Thermoplastics with a low dielectric constant (Dk) and low dissipation factor are desirable for certain applications in the telecommunication field. Despite continuing research and development efforts, there remains a need in the art for blended thermoplastic compositions that effectively address the appropriate balance of properties required in the consumer electronics industry. Aspects of the present disclosure provide thermoplastic compositions having a low dielectric constant and low dissipation factor with improved bonding strength while maintaining desirable mechanical properties and processing characteristics. More specifically, aspects of the present disclosure provide thermoplastic compositions having a dielectric constant of less than 3.0 at a frequency of 1.9 gigahertz (GHz) and a dissipation factor Df of less than 0.01 at 1.9 GHz with improved bonding strength, while maintaining desirable mechanical properties and processing characteristics.

In one aspect, the present disclosure relates to a thermoplastic composition comprising a polymer base resin, a polymer resin, a low dielectric glass fiber component, a hollow filler, and an impact modifier. The thermoplastic composition may exhibit dielectric constant of less than 3.0 at a frequency of 1.9 GHz when tested using a split post dielectric resonator and network analyzer on a sample size of 100 millimeter (mm) by 70 mm and 1.6 mm thickness. The thermoplastic composition may exhibit a dissipation factor Df of less than 0.01 at a frequency of 1.9 GHz when tested using a split post dielectric resonator and network analyzer on a sample size of 100 mm by 70 mm and 1.6 mm thickness. In further aspects, the thermoplastic composition may exhibit a nano-molding technology bonding strength of at least 18 megapascals (MPa) when tested in accordance with a bonding strength test adapted from ISO 19095 with a T treatment and may exhibit a notched impact strength of at least 70 J/m when tested in accordance with ASTM D256 at 23° C. The thermoplastic composition may exhibit a flow rate of less than 25 cubic centimeters per 10 minutes (cm$^3$/10 min) when tested in accordance with ISO 1133 at 275° C. at 5 kilograms (kg) and 300 seconds.

Polymer Base Resin

In an aspect, the thermoplastic composition can comprise a polymer base resin. The polymer base resin can comprise a thermoplastic resin, or a thermoset resin or a thermosetting polymer. Appropriate thermosetting resins can include phenol resin, urea resin, melamine-formaldehyde resin, urea-formaldehyde latex, xylene resin, diallyl phthalate resin, epoxy resin, aniline resin, furan resin, polyurethane, or combinations thereof. In some examples, polymer base resin can comprise a polyester (polyalkylene terephthalate), polyamide, polyetherketone, polyphthalamide, polyarylene ether, a polyphenylene sulfide, a polystyrene, polysiloxane copolymer, or a combination thereof. The polymer resin may also comprise blends and/or other types of combination of resins described above. In certain aspects, the polymer base resin comprises a polyalkylene terephthalate, a polyphenylene sulfide, a polyamide, a polyetherketone, a polyphthalamide, or a polystyrene.

The polymer base resin of the present disclosure may include a polyester such as a polyalkylene terephthalate. Polyesters, which include poly(alkylene dicarboxylates), liquid crystalline polyesters, and polyester copolymers, can be useful in the disclosed thermoplastic compositions of the present disclosure. Polyesters have repeating units of the following formula (A):

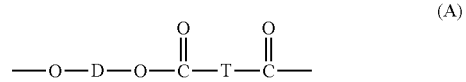
(A)

wherein T is a residue derived from a terephthalic acid or chemical equivalent thereof, and D is a residue derived from polymerization of an ethylene glycol, butylene diol, specifically 1,4-butane diol, or chemical equivalent thereof. Chemical equivalents of diacids include dialkyl esters, e.g., dimethyl esters, diaryl esters, anhydrides, salts, acid chlorides, acid bromides, and the like. Chemical equivalents of ethylene diol and butylene diol include esters, such as dialkylesters, diaryl esters, and the like. In addition to units derived from a terephthalic acid or chemical equivalent thereof, and ethylene glycol or a butylene diol, specifically 1,4-butane diol, or chemical equivalent thereof, other T and/or D units can be present in the polyester, provided that the type or amount of such units do not significantly adversely affect the desired properties of the thermoplastic compositions.

Examples of aromatic dicarboxylic acids include 1,4-naphthalenedicarboxylic acid, 1,5-naphthalenedicarboxylic acid, 2,6-naphthalenedicarboxylic acid, and combinations comprising at least one of the foregoing dicarboxylic acids. Exemplary cycloaliphatic dicarboxylic acids include norbornene dicarboxylic acids, 1,4-cyclohexanedicarboxylic acids, and the like. In a specific aspect, T is derived from a combination of terephthalic acid and isophthalic acid wherein the weight ratio of terephthalic acid to isophthalic acid is 99:1 to 10:90 (or about 99:1 to about 10:90), specifically 55:1 to 50:50 (or about 55:1 to about 1:1). Examples of C6-C12 aromatic diols include, but are not limited to, resorcinol, hydroquinone, and pyrocatechol, as well as diols such as 1,5-naphthalene diol, 2,6-naphthalene diol, 1,4-naphthalene diol, 4,4'-dihydroxybiphenyl, bis(4-hydroxyphenyl)ether, bis(4-hydroxyphenyl)sulfone, and the like, and combinations comprising at least one of the foregoing aromatic diols. Exemplary C2-C12 aliphatic diols include, but are not limited to, straight chain, branched, or cycloaliphatic alkane diols such as propylene glycol, i.e., 1,2- and 1,3-propylene glycol, 2,2-dimethyl-1,3-propane diol, 2-ethyl-2-methyl-1,3-propane diol, 1,4-but-2-ene diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol, including its cis- and trans-isomers, triethylene glycol, 1,10-decanediol; and combinations comprising at least of the foregoing diols.

In another aspect, the compositions of the present disclosure can include polyesters including, for example, aromatic polyesters, polyalkylene esters (also designated as poly (alkylene esters)) including poly(alkylene arylates), and poly(cycloalkylene diesters). Aromatic polyesters can have a polyester structure according to formula (A), wherein D and T are each aromatic groups as described hereinabove. In an aspect, useful aromatic polyesters can include, for example, poly(isophthalate-terephthalate-resorcinol)esters, poly(isophthalate-terephthalate-bisphenol A)esters, poly [(isophthalate-terephthalate-resorcinol)ester-co-(isophthalate-terephthalate-bisphenol A)] ester, or a combination comprising at least one of these. Also contemplated are aromatic polyesters with a minor amount, e.g., about 0.5 to about 10 wt. %, based on the total weight of the polyester, of units derived from an aliphatic diacid and/or an aliphatic polyol to make copolyesters. Poly(alkylene arylates) can have a polyester structure according to formula (A), wherein T comprises groups derived from aromatic dicarboxylates, cycloaliphatic dicarboxylic acids, or derivatives thereof.

Examples of specifically useful T groups include, but are not limited to, 1,2-,1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene)dimethylene.

Examples of polyalkylene terephthalate include polyethylene terephthalate (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations including at least one of the foregoing polyesters may also be used.

Copolymers including alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer includes greater than or equal to 50 mol % of poly(ethylene terephthalate), and abbreviated as PCTG where the polymer comprises greater than 50 mol % of poly(1,4-cyclohexanedimethylene terephthalate). Poly(cycloalkylene diester)s can also include poly(alkylene cyclohexanedicarboxylate)s. Of these, a specific example is poly(1,4-cyclohexane-dimethanol-1,4-cyclohexanedicarboxylate) (PCCD), having recurring units of formula (B):

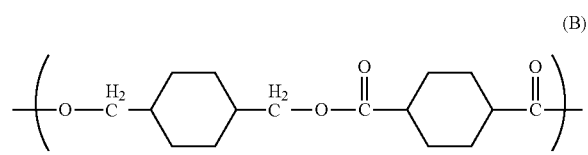

(B)

wherein, as described using formula (A), $R^2$ is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

In one aspect, the polymer base resin may poly(1,4-butylene terephthalate) or PBT resin. Commercial examples of PBT include those available under the trade names VALOX™ 315, VALOX™ 195 and VALOX™ 176, manufactured by SABIC™. These examples of PBT may have an intrinsic viscosity of 0.1 deciliters per gram (dl/g) to about 2.0 dl/g (or 0.1 dl/g to 2 dl/g) as measured in a 60:40 phenol/tetrachloroethane mixture or similar solvent at 23 degrees Celsius (° C.) to 30° C. In one aspect, the PBT resin may have a low intrinsic viscosity (of 0.1 dl/g to 1.4 dl/g (or about 0.1 dl/g to about 1.4 dl/g), specifically 0.4 dl/g to 1.4 dl/g (or about 0.4 dl/g to about 1.4 dl/g)). In further aspects, the PBT resin may have a high intrinsic viscosity. The polymer base resin may comprise a combination of a high and a low intrinsic viscosity PBT resin.

In yet further aspects, the polymer base resin may comprise polyester-polycarbonate copolymer. In one embodiment, polyester-polycarbonates contain repeating units of formula (A), above, wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one aspect, D is a $C_{2-6}$ alkylene radical. In another embodiment, D is derived from an aromatic dihydroxy compound of formula (C):

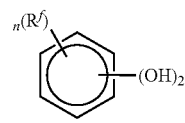

(C)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 91:1 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In a further aspect, carbonate units of formula (1) may also be derived from aromatic dihydroxy compounds of formula (7), wherein specific carbonate units are resorcinol carbonate units.

Specifically, the polyester unit of a polyester-polycarbonate can be derived from the reaction of a combination of isophthalic and terephthalic diacids (or derivatives thereof with resorcinol, bisphenol A, or a combination comprising one or more of these, wherein the molar ratio of isophthalate units to terephthalate units is 91:9 to 2:98, specifically 85:15 to 3:97, more specifically 80:20 to 5:95, and still more specifically 70:30 to 10:90. In case the polycarbonate comprises units derived from resorcinol and/or bisphenol A, the molar ratio of resorcinol carbonate units to bisphenol A carbonate units of 0:100 to 99:1, and the molar ratio of the mixed isophthalate-terephthalate polyester units to the polycarbonate units in the polyester-polycarbonate can be 1:99 to 99:1, specifically 5:95 to 90:10, more specifically 10:90 to 80:20. Where a blend of polyester-polycarbonate with polycarbonate is used, the ratio of polycarbonate to polyester-polycarbonate in the blend can be, respectively, 1:99 to 99:1, specifically 10:90 to 90:10.

In a specific aspect, the polymer base resin may comprise a resorcinol based aryl polyester or a resorcinol based polyester carbonate polymer. ITR (isophthalate terephthalate resorcinol) Resorcinol-based aryl polyesters and "resorcinol-based polyaryl esters" and "resorcinol-based polyarylate" shall all mean a copolymer comprising resorcinol moieties and resorcinol-based ester linkages and possibly other linkages also such as resorcinol-based polycarbonate linkages. These terms are meant to include both polyesters only containing ester bonds and polyester carbonates in instances where resorcinol-based polycarbonate linkages are present. Thus, the polyester-polycarbonate copolymer may comprise repeating structural carbonate units of bisphenol A and repeating structural ester units, which may be any copolymer of BPA polycarbonate and resorcinol phthalate (ITR) (D), and such as (E).

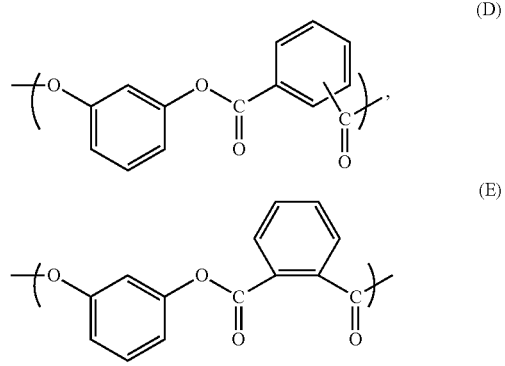

These copolycarbonates may be synthesized by a skilled artisan, or can be obtained commercially, for example, SABIC LEXAN™ SLX resin. LEXAN™ SLX resin is ITR-polycarbonate copolymer with molecular weight 20,000-30,000, refractive index around 1.59-1.603.

As an example, a resorcinol-based polyaryl ester may comprise both carbonate linkages (e.g., between a resorcinol moiety and a bisphenol A moiety) and ester linkages (e.g., between a resorcinol moiety and an isophthalic acid moiety).

In some instances, the resorcinol-based polyarylate resin may contain at least about 40 mole % of moieties derived from resorcinol. The resorcinol moieties can be introduced as the reaction product of resorcinol, or functionalized resorcinol, with an aryl dicarboxylic acid or aryl dicarboxylic acid derivatives suitable for the formation of aryl ester linkages with the resorcinol. Suitable dicarboxylic acid derivatives include, for example, carboxylic acid halides, carboxylic acid esters and carboxylic acid salts.

The resorcinol-based polyarylate may further contain carbonate linkages derived from reaction of a bisphenol and a carbonate forming species, such as phosgene, making the resorcinol-based polyarylate a polyester carbonate copolymer. In another embodiment of the invention, resorcinol polyarylate carbonate copolymers will comprise the reaction products of iso- and terephthalic acid, resorcinol and optionally, bisphenol A and phosgene. In one aspect, the resorcinol polyester carbonate copolymer will be made in such a way that the number of bisphenol dicarboxylic ester linkages is minimized, for example by pre-reacting the resorcinol with the dicarboxylic acid to form an aryl polyester block and then reacting the aryl polyester block with the bisphenol and carbonate moiety to form the polycarbonate portion of the copolymer. Examples of resorcinol ester containing polymers can be found in U.S. Pat. Nos. 6,861,482, 6,559,270, 6,265,522, 6,294,647, 6,291,589 and 5,916,997.

In further aspects, the disclosed composition may comprise a styrenic polymer or a polystyrene as the polymer base resin. The term "styrenic polymer" as used herein includes styrenic polymers prepared by methods known in the art including bulk, suspension, and emulsion polymerization, which contain at least 25 weight percent of structural units derived from monomer of the formula (F):

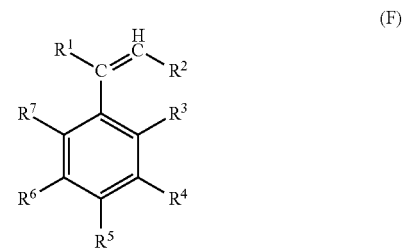

wherein $R^1$ and $R^2$ each independently represent a hydrogen atom, a Ci-Cs alkyl group, or a $C_2$-C8 alkenyl group; R 3 and R 7 each independently represent a hydrogen atom, or a Ci-C s alkyl group; and $R^4$, $R^5$, and $R^6$ each independently represent a hydrogen atom, a Ci-Cs alkyl group, or a $C_2$-C8 alkenyl group, or $R^3$ and $R^4$ are taken together with the central aromatic ring to form a naphthyl group. Specific alkenyl aromatic monomers include, for example, styrene and methylstyrenes such as alpha-methylstyrene and p-methylstyrene. In some embodiments, the alkenyl aromatic monomer is styrene.

Exemplary polystyrenes include homopolystyrenes (including atactic, syndiotactic, and isotactic polystyrenes) and rubber-modified polystyrenes (also known as "high-impact polystyrenes" or "HIPS"). In some aspects, the polystyrene comprises a homopolystyrene having a number average molecular weight of about 30,000 to about 100,000 atomic mass units, specifically about 40,000 to about 60,000 atomic mass units. Suitable homopolystyrenes are commercially available as, for example EB3300 from Chevron. In some embodiments, the polystyrene comprises a rubber-modified polystyrene comprising about 88 to about 94 weight percent polystyrene and about 6 to about 12 weight percent polybutadiene, with an effective gel content of about 10% to about 35%. Suitable rubber-modified polystyrenes are commercially available as, for example, GEH 1897 from SABIC, and D7022.27 from Chevron. The polystyrene according to the present disclosure may be a homopolystyrene.

As used herein, the term homopolystyrene refers to a homopolymer of styrene. Thus, the residue of any monomer other than styrene is excluded from the homopolystyrene. The homopolystyrene can be atactic, syndiotactic, or isotactic. The homopolystyrene may have a melt volume flow rate of 1.5 to 5 cubic centimeters per 10 minutes, measured at 200° C. and 5-kilogram load according to ISO 1133. In some aspects, the polystyrene comprises a syndiotactic polystyrene. Other polystyrenes may be present in the disclosed composition; for example, a general purposes polystyrene may be present as a low Dk polymer resin.

Syndiotactic polystyrene may comprise a polystyrene with a highly regular stereochemical structure, that is to say, a highly syndiotactic configuration. That is, the phenyl groups and substituted phenyl groups of the side groups are alternately located at opposite positions with respect to the main polymer chain. The tacticity in the stereochemical structure may be quantitatively determined by measurement of the nuclear magnetic resonance (NMR) using an isotope of carbon ($^{13}$C-NMR). The tacticity measured by the $^{13}$C-NMR method can show the content of a sequence in which a specific number of the constituting units are bonded in sequence, such as a diad in which two constituting units are bonded in sequence, a triad in which three constituting units are bonded in sequence, and a pentad in which five constituting units are bonded in sequence. A syndiotactic polystyrene is herein defined as a polystyrene, poly(alkylstyrene), poly(halogenated styrene), poly(halogenated alkylstyrene), poly(alkoxystyrene), poly(vinylbenzoic acid ester), hydrogenated derivative of these polymers, mixtures comprising one of the foregoing polymers, or a copolymer containing constituting units of these polymers as the main components, which generally has the syndiotacticity of 75% or more, preferably 85% or more, expressed in terms of the content of the racemic diad, or 30% or more, preferably 50% or more, expressed in terms of the content of the racemic pentad.

Examples of syndiotactic polystyrene include polystyrene, poly(p-methylstyrene), poly(m-methylstyrene), poly(p-tertiary-butylstyrene), poly(p-chlorostyrene), poly(m-chlorostyrene), poly(p-fluorostyrene), hydrogenated polystyrene, copolymers containing comprising units of the above polymers and combinations comprising one of the foregoing syndiotactic polystyrenes.

The molecular weight of the styrenic polymer is not particularly limited. The weight-average molecular weight may be greater than or equal to about 10,000 atomic mass units (AMU), and preferably greater than or equal to about 50,000, as determined by gel permeation chromatography. The molecular weight distribution is not particularly limited, and syndiotactic polystyrene having various molecular weight distributions can be used. The melting point of the syndiotactic polystyrene is about 200 to about 310° C.

In some aspects, the polystyrene content is about 10 to about 90 weight percent, specifically about 15 to about 80 weight percent, more specifically about 20 to about 70 weight percent, still more specifically about 25 to about 60 weight percent, even more specifically about 30 to about 50 weight percent, yet more specifically about 35 to about 45 weight percent, based on the total weight of the composition.

In various aspects, the polymer base resin can comprise a polyaryl sulfide (or a poly(arylene) sulfide), such as a polyphenylene sulfide. Poly(arylene sulfide)s are a class of polymers containing arylene groups separated by sulfur atoms. They include poly(phenylene sulfide)s, for example poly(p-phenylene sulfide), and substituted poly(phenylene sulfide)s. Typical poly(arylene ether)s comprise at least 70 mole percent, specifically at least 90 mole percent, more specifically at least 95 mole percent, of recurring paraphenylene sulfide units having the structure (H)

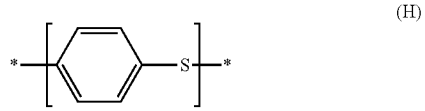
(H)

When the amount of said recurring units is less than 70 molar %, the heat resistance is somewhat limited. The remaining up to 30 mole percent of recurring units in the poly(arylene sulfide) can, in some aspects, have a structure selected from

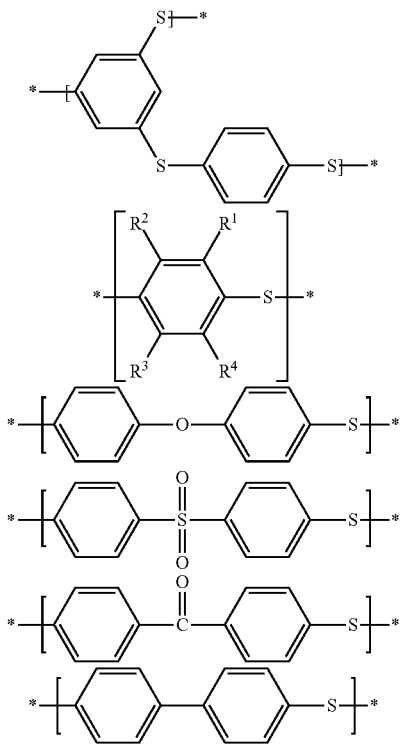

wherein $R^1$, $R^2$, $R^3$ and $R^4$ are, independently at each occurrence, hydrogen, halogen, $C_1$-$C_{12}$ hydrocarbyl, $C_1$-$C_{12}$ hydrocarbyloxy, nitro, amino, carboxy, or the like.

The poly(arylene sulfide) can be a linear, branched, or cured polymer, or a mixture of at least two of the foregoing. The poly(arylene sulfide) can be functionalized or unfunctionalized. If the poly(arylene sulfide) is functionalized, the functional groups can include amino, carboxylic acid, metal carboxylate, disulfide, thiol, and metal thiolate groups. One method for incorporation of functional groups into poly(arylene sulfide) can be found in U.S. Pat. No. 4,769,424 to Takekoshi et al., which discloses incorporation of substituted thiophenols into halogen substituted poly(arylene sulfide)s. Another functionalizing method involves incorporation of chloro-substituted aromatic compounds containing the desired functionality reacted with an alkali metal sulfide and chloroaromatic compounds. A third functionalizing method involves reaction of poly(arylene sulfide) with a disulfide containing the desired functional groups, typically in the melt or in a suitable high boiling solvent such as chloronapthalene.

The melt viscosity of PPS used in the present disclosure is not particularly limited so far as the moldings which can be obtained. A melt viscosity of at least 100 Poise may be useful from the viewpoint of the toughness of PPS per se and that of 10,000 Poise or less may be useful from the viewpoint of the moldability. In some embodiments, the poly(arylene sulfide) can have a melt flow rate less than or equal to 100 grams per 10 minutes measured at 316° C. and 5 kilogram load according to ASTM D1238. Specifically, the melt flow rate may be 50 to 100 grams per 10 minutes.

The polymer base resin can comprise a polyamide resin. Polyamide resins can include a generic family of resins known as nylons which can be characterized by the presence of an amide group (—C(O)NH—). The resins include repeating units linked by an amide group bond. Polyamide resins may be obtained according to well-known processes such as those described in U.S. Pat. Nos. 2,071,250; 2,071,251; 2,130,523; 2,130,948; 2,241,322; 2,312,966; and 2,512,606. As an example, polyamides can be prepared by polymerizing a monoamine-monocarboxylic acid or a lactam thereof having at least two carbon atoms between the amino and carboxylic acid groups. Polyamides may also be prepared by polymerizing substantially equimolecular proportions of a carboxylic acid and a diamine containing at least two carbon atoms between the amino groups. In further examples, polyamides can be prepared by polymerizing a monoaminocarboxylic acid or a lactam thereof with substantially equimolecular proportions of a diamine and dicarboxylic acid. Polyamide resins are commercially available from a wide variety of sources. As used herein, substantially equimolecular proportions can refer to both equimolecular proportions and the departures therefrom which are involved in conventional techniques to stabilize the viscosity of the resultant polyamide. Copolymers of caprolactam with diacids and diamines are also useful.

Monoaminomonocarboxylic acids or lactams thereof may include compounds having from two to sixteen carbon atoms between the amino can carboxylic acid groups. For lactams, the carbon atoms form ring with the —CO—NH— group. Exemplary aminocarboxylic acids and lactams can include 6-aminocaproic acid, butyrolactam, enantholactam, pivaloactam, caprolactam, undecanolactam, capryllactam, dodecanolactam, and 3- and 4-aminobenzoic acids.

Diamines useful in polyamide preparation may include alkyl, aryl and alkyl-aryl diamines. Suitable diamines may be represented by the general formula $H_2N(CH_2)_nNH_2$ where n is an integer from 2 to 16. Exemplary diamines may include, but are not limited to, trimethylenediamine, pentamethylene diamine, tetramethylenediamine, octamethylenediamine, hexamethylenediamine, trimethyl hexamethylene diamine, metaxylylene diamine, meta-phenylene diamine, and the like. Other useful diamines include m-xylyene diamine, di-(4-aminophenyl)methane, di-(4-aminocyclohexyl)methane; 2,2-di-(4-aminophenyl)propane, 2,2-di-(4-aminocyclohexyl)propane, among others. Suitable dicarboxylic acids may be aromatic or aliphatic. Aromatic dicarboxylic acids may include isophthalic and terephthalic acids. Aliphatic dicarboxylic acids may be represented by the formula HOOC—Y—COOH where Y represents a divalent aliphatic group containing at least two carbon atoms. Exemplary dicarboxylic acids may include sebacic acid, suberic acid, octadecanedoic acid, glutaric acid, adipic acid, and pimelic acid. Other useful diacids for the preparation of nylons include azelaic acid, dodecane diacid, as well as terephthalic and isophthalic acids, and the like.

Polyamides may generally include aliphatic polyamides which feature an aliphatic main chain; high performance polyamides which feature repeating units of the semiaromatic polypthalamide molecule; and aramides which feature repeating aromatic units.

Exemplary polyamide resins can include nylon-6 (polyamide 6) and nylon-6,6 (polyamide 6,6) which are available from a variety of commercial sources. Other exemplary polyamides can include nylon-4, nylon-4,6 (PA 46), nylon-12, nylon-6,10, nylon-6,9, nylon-6,12, nylon-9T, copolymer of nylon-6,6 and nylon-6, nylon 610 (PA610), nylon 11 (PA11), nylon 12 (PA 12), nylon 6-3-T (PA 6-3-T), polyarylamid (PA MXD 6), polyphthalamide (PPA) and/or polyether-block amide, and others such as the amorphous nylons, may also be useful. Nylon-6, for example, is a polymerization product of caprolactam. Nylon-6,6 is a condensation product of adipic acid and 1,6-diaminohexane. Likewise, nylon 4,6 is a condensation product between adipic acid and 1,4-diaminobutane.

Mixtures of various polyamides, as well as various polyamide copolymers, are also useful. In some examples, the polyamide resin can include a combination of nylon resins.

In certain aspects, the polymer base resin may comprise a polyphthalamide resin. Polyphthalamides (PPA) are semi-aromatic, high temperature nylons that typically have melting points higher than 290° C. and glass transitions temperatures greater than 100° C. PPAs are generally based on polyamide 6T (PA 6T or nylon-6T). PPAs generally are copolymers that have various ratios of polyamide 6T, polyamide 6I, and polyamide 6/6 to control properties such as melt flow, melting point, and glass transition temperature.

Polyphthalamides comprise repeating units having formula (I)

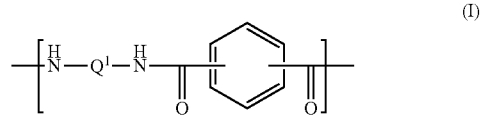

(I)

wherein $Q^1$ is independently at each occurrence a branched or unbranched alicyclic alkyl group having 4 to 8 carbons. In some aspects, Q' is independently at each occurrence a 1,6-hexyl group. Polyamide resins, in general characterized by the presence of an amide group (—C(O)NH—) which is the condensation product of a carboxylic acid and an amine. Polyphthalamides are the condensation product of terephthalic acid and an amine, isophthalic acid and an amine or a combination of terephthalic acid, isophthalic acid and an amine.

The polyphthalamide can be a block copolymer or a random copolymer comprising the units of formula (I) and units of formula (J)

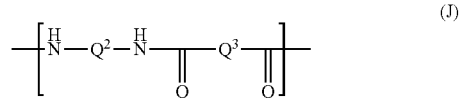

(J)

wherein $Q^2$ and $Q^3$ are independently at each occurrence a branched or unbranched alicyclic alkyl group having 4 to 12 carbons. $Q^2$ and $Q^3$ can be the same or different alicyclic alkyl group.

In some aspects, the polymer base resin comprises a polyarylether ketone (PAEK).

Polyaryl ether ketones comprise several polymer types containing aromatic rings, usually phenyl rings, linked primarily by ketone and ether groups in different sequences. Examples of PAEK resins include, but are not limited to, polyether ketones (PEK), polyether ether ketones (PEEK), polyether ketone ether ketone ketones (PEKEKK) and polyether ketone ketones (PEKK) and copolymers containing such groups as well as blends thereof. The PAEK polymers may comprise monomer units containing an aromatic ring, usually a phenyl ring, a ketone group and an ether group in any sequence. Low levels, for example less than 10 mole %, of addition linking groups may be present as long as they do not fundamentally alter the properties of the PAEK resin. PEEK is commercially available from Victrex Ltd. as VICTREX™ PEEK. PEKEKK resin is commercially available from BASF Co. as ULTRAPEK. Polyether ether ketone resins are also available under the GATONE and KETASPIRE trade names from Solvay Co. and Solvay Advanced Polymers.

For example, several polyaryl ether ketones which are highly crystalline, with melting points above 300° C., can be used in blends according to the present disclosure. Examples of these crystalline polyaryl ether ketones are shown in the structures (K), (L), (M), (N), and (O) below.

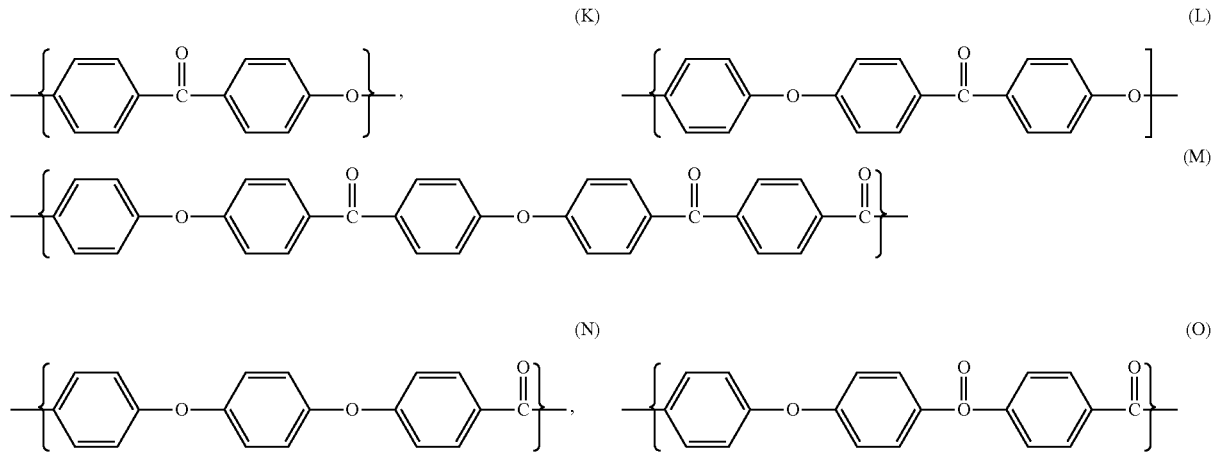

The formation and properties of polyaryl ether ketones is well known in the art. For example, the electrophilic aromatic substitution (e.g., Friedel-Crafts catalyzed) reaction of aromatic diacyl halides with unsubstituted aromatic compounds such as diphenyl ether some of the early work is disclosed in, for example, U.S. Pat. No. 3,065,205.

Other examples of crystalline polyaryl ether ketones which are suitable for use herein can be generically characterized as containing repeating units of the following formula (Q):

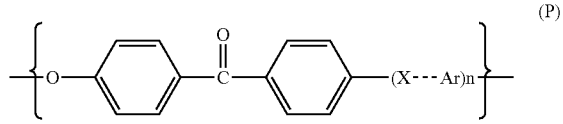

wherein Ar is independently a divalent aromatic radical selected from phenylene, biphenylene or naphthylene, X is independently —O—, —C(O)—, —O—Ar—C(O)—, —S—, —SO$_2$— or a direct bond, and n is an integer of from 0 to about 10. PAEK resins can be prepared by methods well known in the art. The polyaryl ether ketones may have a reduced viscosity of about 0.4 to about 5.0 dl/g, as measured in concentrated sulfuric acid at 25° C. PAEK resin weight average molecular weight (Mw) may vary from 5,000 to 150,000 grams per mole (g/mol), specifically from about 10,000 to 80,000 g/mole. It is noted however that for NMT, crystallization speed may be more critical because the melt must enter the holes of the metal surface prior to crystallization.

The polymer base resin may comprise a polycarbonate-polysiloxane copolymer. As used herein, the term "polycarbonate-polysiloxane copolymer" is equivalent to polysiloxane-polycarbonate copolymer, polycarbonate-polysiloxane polymer, or polysiloxane-polycarbonate polymer. In various aspects, the polycarbonate-polysiloxane copolymer can be a block copolymer comprising one or more polycarbonate blocks and one or more polysiloxane blocks. The polysiloxane-polycarbonate copolymer comprises polydiorganosiloxane blocks comprising structural units of the general formula (Q) below:

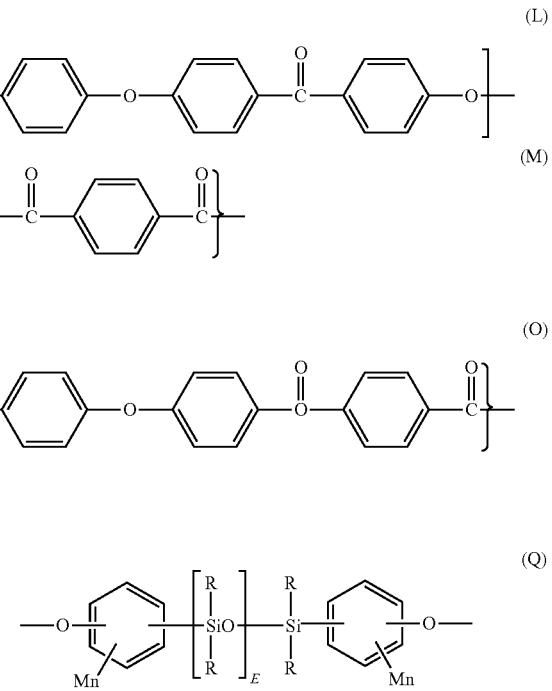

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (R) below:

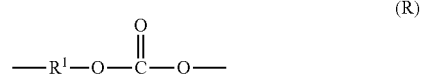

wherein at least 60 percent of the total number of $R^1$ groups comprise aromatic moieties and the balance thereof comprise aliphatic, alicyclic, or aromatic moieties. Polysiloxane-polycarbonates materials include materials disclosed and described in U.S. Pat. No. 7,786,246, which is hereby incorporated by reference in its entirety for the specific purpose of disclosing various compositions and methods for manufacture of same.

Non-limiting examples of polysiloxane-polycarbonate copolymers can comprise various copolymers available from SABIC. In an aspect, the polysiloxane-polycarbonate copolymer can contain 60% by weight polysiloxane content based upon the total weight of the polysiloxane-polycarbonate copolymer. In various aspects, the 60% by weight polysiloxane block copolymer can have a weight average molecular weight (Mw) of from about 32,000 to 36,000 Daltons using gel permeation chromatography with a bisphenol A polycarbonate absolute molecular weight standard. In another example, the polysiloxane-polycarbonate block can comprise 20% by weight polysiloxane based upon the total weight of the polysiloxane block copolymer. For example, an appropriate polysiloxane-polycarbonate copolymer can be a bisphenol A polysiloxane-polycarbonate copolymer endcapped with para-cumyl phenol (PCP) and having a 20% polysiloxane content (see C9030P, commercially available from SABIC as "opaque" EXL C9030P). In various aspects, the weight average molecular weight of the 20% polysiloxane block copolymer can be about 28,000 Daltons to about 32,000 Daltons when tested according to a polycarbonate standard using gel permeation chromatography (GPC) on a cross-linked styrene-divinylbenzene column and calibrated to polycarbonate references using a ultraviolet-visible (UV-VIS) detector set at 264 nm on 1 mg/ml samples eluted at a flow rate of about 1.0 ml/minute. Moreover, the 20% polysiloxane block copolymer can have an MVR at 300° C./1.2 kg of 7 cm$^3$/10 min and can exhibit siloxane domains sized in a range of from about 5 micron to about 20 micrometers (microns, μm).

In some aspects, the polymeric base resin can be present in the thermoplastic composition in an amount from about 20 wt. % to about 90 wt. %. In other aspects, the polymeric base resin can be present in an amount from about 30 wt. % to about 80 wt. %, or from about 40 wt. % to about 70 wt. %, or from about 50 wt. % to about 70 wt. %, from about 15 wt. % to about 78 wt. %, from about 15 wt. % to about 75 wt. %, from about 15 wt. % to about 76 wt. %, from about 15 wt. % to about 72 wt. %. or from about 55 wt. % to about 65 wt. %. The thermoplastic composition may comprise from about 50 weight percent (wt. %) to about 90 weight percent of the polybutylene terephthalate based on the total weight of the composition. The PBT resin may be present in any amount between the endpoints. For example, the composition may comprise about 70 wt. % of a polybutylene terephthalate or a combination of PBT resins.

Low Dielectric Constant Glass Fiber

In various aspects, the composition can comprise a low dielectric constant fiber filler, specifically, a low dielectric constant glass fiber filler. It is desirable for the low dielectric constant filler to have a low dissipation factor Df. That is, the low dielectric constant filler has a Dk of less than 5.0 (about 4.5) at a frequency of from 1 megahertz (MHz) to 1 GHz and a Df of less than about 0.002 at a frequency of from 1 MHz to 1 GHz. In certain examples, the low dielectric constant filler is a dielectric glass fiber having a Dk of less than 5.0 at a frequency of from 1 MHz to 1 GHz and a Df of less than about 0,002 at a frequency of from 1 MHz to 1 GHz.

The low dielectric constant glass fibers used in select aspects of this disclosure may be surface-treated with a surface treatment agent containing a coupling agent to improve adhesion to the polymer base resin. Suitable coupling agents can include, but are not limited to, silane-based coupling agents, titanate-based coupling agents or a mixture thereof. Applicable silane-based coupling agents include aminosilane, epoxysilane, amidesilane, azidesilane and acrylsilane. Organo metallic coupling agents, for example, titanium or zirconium-based organo metallic compounds, may also be used. In exemplary aspects, the glass fiber used in the invention may be selected from F-glass, S-glass, AR-glass, T-glass, D-glass R-glass, and combinations thereof. As an example, the glass fiber can be an "E" glass type which is a class of fibrous glass filaments included of lime-alumino-borosilicate glass.

As noted herein, in certain examples the disclosed composition includes from 5 wt. % to about 65 wt. % of a dielectric glass fiber. In other examples, the composition comprises from 10 wt. % to 50 wt. or from about 10 wt. % to about 48 wt. % glass fiber, or 10 wt. % to 45 wt. %, from about 10 wt. % to about 40 wt. % dielectric glass fiber, or from 10 wt. % to 30 wt. %, about 10 wt. to about 30 wt. % dielectric glass fiber, or even from 10 wt. to 20 wt. %, or from about 10 wt. % to about 20 wt. % dielectric glass fiber. In yet further examples, the disclosed thermoplastic compositions comprise less than 50 wt. %, less than 40 wt. %, or less than 30 wt. % dielectric glass fiber.

The low dielectric constant glass fiber may have a variety of shapes. The low dielectric constant glass fiber may include milled or chopped glass fibers. The low dielectric constant glass filler may be in the form of whiskers or flakes. In further examples, the low dielectric constant glass fiber may be short glass fiber or long glass fiber. Low dielectric constant Glass fibers having a length of about 4 mm (millimeter) or longer are referred as to long fibers, and fibers shorter than this are referred to as short fibers. In one aspect, the diameter of the glass fibers can be about 10 micrometer (μm), or from about 2 μm to about 15 μm, or from about 5 μm to about 12 μm.

The low dielectric constant glass fiber may have a round, flat, or irregular cross-section. Thus, use of non-round fiber cross sections is possible. In a still further aspect, the low dielectric constant glass fiber has a circular cross-section. In a yet further aspect, the diameter of the low dielectric constant glass fiber is from about Ito about 15 μm. More specifically, the diameter of the low dielectric constant glass fiber may be from about 4 to about 10 μm.

Hollow Filler

In addition to the polymer base resin and dielectric glass fiber, the disclosed composition may comprise a hollow filler. In certain aspects, the hollow filler is a hollow glass sphere. Hollow glass fillers of the claimed strands typified in this patent may be fibers having outside diameters of 0.0003 inches (in.) to 0.003 in. (0.000762 cm to 0.00762 cm) and having 10 to 65 percent of their volume hollow. Also provided, as stated in the aforementioned patent, was a significant reduction in the dielectric constant of materials reinforced with the hollow glass fibers of the patent over those reinforced with solid fibers.

The hollow filler may comprise a hollow glass sphere, hollow glass fiber, or a hollow ceramic sphere for example. In specific examples, the hollow filler may be a hollow glass sphere. Exemplary hollow glass spheres may have a density of from about 0.2 grams per cubic centimeter (g/cm$^3$). For example, a suitable hollow glass sphere may have a density of about 0.46 g/cm$^3$. In a further example, a suitable hollow glass sphere may have a density of about 0.6 g/cm$^3$. The hollow glass sphere may have a diameter of from about 5 micrometers (μm) to about 50 μm. For example, a suitable hollow glass sphere may have a diameter of about 30 μm, or about 20 μm. A further hollow glass sphere may have a diameter of about 10 μm. A hollow glass sphere may exhibit a Dk of about 1.2 to 2.0.

The thermoplastic composition may comprise from about 3 wt. % to about 40 wt. % or from about 5 wt. % to about 40 wt. % of a hollow filler. For example, the thermoplastic composition may comprise from about 3 wt. % to about 45 wt. %, from about 3 wt. % to about 38 wt. %, from about 3 wt. % to about 35 wt. %, from about 10 wt. % to about 45 wt. %, or from about 10 wt. % to about 38 wt. % of a hollow filler.

Impact Modifier

As an example, the disclosed composition can comprise an impact modifier. The impact modifier can be a chemically reactive impact modifier. By definition, a chemically reactive impact modifier can have at least one reactive group such that when the impact modifier is added to a polymer composition, the impact properties of the composition (expressed in the Izod impact values) are improved. In some examples, the chemically reactive impact modifier can be an ethylene copolymer with reactive functional groups selected from, but not limited to, anhydride, carboxyl, hydroxyl, and epoxy.

In further aspects of the present disclosure, the composition can comprise a rubbery impact modifier. The rubber impact modifier can be a polymeric material which, at room temperature, is capable of recovering substantially in shape and size after removal of a force. However, the rubbery impact modifier should typically have a glass transition temperature of less than 0° C. In certain aspects, the glass transition temperature (Tg) can be less than −5° C., −10° C., −15° C., with a Tg of less than −30° C. typically providing better performance. Representative rubbery impact modifiers can include, for example, functionalized polyolefin ethylene-acrylate terpolymers, such as ethylene-acrylic esters-maleic anhydride (MAH) or glycidyl methacrylate (GMA). The functionalized rubbery polymer can optionally contain repeat units in its backbone that are derived from an anhydride group containing monomer, such as maleic anhydride. In another scenario, the functionalized rubbery polymer can contain anhydride moieties that are grafted onto the polymer in a post polymerization step.

In one example, the composition can comprise a core-shell copolymer impact modifier having about 80 wt. % of a core comprising poly(butyl acrylate) and about 20 wt. % of a shell comprising poly(methyl methacrylate). Suitable impact modifiers include the ethylene-methyl acrylate-glycidyl methacrylate terpolymer including 8 wt % glycidyl methacrylate units available under the trade name Lotader™ AX8900. In a further example, the impact modifier can comprise an acrylic impact modifier such as ethylene-ethylacrylate copolymer with an ethyl acrylate content of less than 20 wt. % (such as EXL 3330 as supplied by SABIC).

The impact modifier may be present in an amount of from about 0.1 wt. % to about 10 wt. %, or from about 0.1 wt. % to about 8 wt. %, or from about 0.1 wt. % to about 5 wt. %, or from about 0.1 wt. % to about 4 wt. %, or from about 1 wt. % to about 5 wt. %. For example, the thermoplastic composition may comprise about 5 wt. % of the impact modifier. In yet further examples, the thermoplastic composition may comprise about 2 wt. % of an impact modifier.

Low Dk Polymer Resin

The disclosed thermoplastic composition may further comprise one or more additional polymer resins exhibiting a low dielectric constant. A low Dk polymer resin may refer to a polymer resin having a Dk of less than 2.8, when tested using resonant cavity. Exemplary low Dk polymer resins may include, but are not limited to, a general purpose polystyrene, a polypropylene, or a polytetrafluoroethylene.

The low Dk polymer resin may comprise a styrenic polymer, such as a general purpose polystyrene GPPS. GPPS is atactic polystyrene (aPS). Atactic polystyrene, compared to sPS, may comprise a polystyrene with an irregular stereochemical structure. Phenyl groups and substituted phenyl groups of the side groups are randomly located at positions along the main polymer chain. GPPS may have a Dk of about 2.55.

A further exemplary low Dk polymer resin may comprise a polypropylene. Polypropylene may exhibit a Dk of about 2.2. Polypropylene may refer to a propylene homopolymer or a copolymer of propylene with an a-olefin, for example an a-olefin chosen from the group of a-olefin having 2 or 4 to 10 C-atoms, for example wherein the amount of alpha-olefin is less than 10 wt. % based on the total propylene copolymer. The polypropylene polymer may be a homopolymer, a copolymer or a random polymer. As an example, the polypropylene may be a propylene/α-olefin copolymer. Each α-olefin monomer may have 2-12 C-atoms. The α-olefin monomer may be selected from the group comprising ethylene, butylene and octene. The polypropylene homopolymer part in such a copolymer is preferably present in an amount equal to or less than 90 wt %, more preferred equal to or less than 85 wt %; most preferred equal to or less than 80 wt %. The α-olefin content of such a co- or random polymer is generally above 4 wt %, more preferred above 8 wt %, most preferred above 12 wt %.

The polypropylene polymer may be prepared polymer via any known polymerization technique as well as with any known polymerization catalyst system. Regarding the techniques, reference can be given to slurry, solution or gas phase polymerizations; regarding the catalyst system reference can be given to Ziegler-Natta, metallocene, or (other) single-site catalyst systems. All are, in themselves, known in the art. In some examples, the polypropylene polymer may comprise a homopolymer. In further examples, the polypropylene polymer may have a high molecular weight.

In various aspects, the thermoplastic composition may comprise a low Dk polymer resin in the polymer base resin component. The low Dk polymer resin may be present in an amount of from 15 wt. % to about 50 wt. %, from about 15 wt. % to about 45 wt. %, from about 10 wt. % to about 42 wt. %, or from about 15 wt. % to about 35 wt. %.

Additives

The disclosed thermoplastic composition can comprise one or more additives conventionally used in the manufacture of molded thermoplastic parts with the proviso that the optional additives do not adversely affect the desired properties of the resulting composition. Mixtures of optional additives can also be used. Such additives can be mixed at a suitable time during the mixing of the components for forming the composite mixture. Exemplary additives can include ultraviolet agents, ultraviolet stabilizers, heat stabilizers, antistatic agents, anti-microbial agents, anti-drip agents, radiation stabilizers, pigments, dyes, fibers, fillers, plasticizers, fibers, flame retardants, antioxidants, lubricants, wood, glass, and metals, and combinations thereof.

The thermoplastic composition disclosed herein can comprise one or more additional fillers. The filler can be selected to impart additional impact strength and/or provide additional characteristics that can be based on the final selected characteristics of the polymer composition. In some aspects, the filler(s) can comprise inorganic materials which can include clay, titanium oxide, asbestos fibers, silicates and silica powders, boron powders, calcium carbonates, talc, kaolin, sulfides, barium compounds, metals and metal oxides, wollastonite, glass spheres, glass fibers, flaked fillers, fibrous fillers, natural fillers and reinforcements, and reinforcing organic fibrous fillers.

Appropriate fillers or reinforcing agents can include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations comprising at least one of the foregoing fillers or reinforcing agents. The fillers and reinforcing agents can be coated with a layer of metallic material to facilitate conductivity, or surface treated, with silanes for example, to improve adhesion and dispersion with the polymer matrix. Fillers generally can be used in amounts of 1 to 200 parts by weight, based on 100 parts by weight of based on 100 parts by weight of the total composition.

In some aspects, the thermoplastic composition may comprise a synergist. In various examples fillers may serve as flame retardant synergists. The synergist facilitates an improvement in the flame retardant properties when added to the flame retardant composition over a comparative composition that contains all of the same ingredients in the same quantities except for the synergist. Examples of mineral fillers that may serve as synergists are mica, talc, calcium carbonate, dolomite, wollastonite, barium sulfate, silica, kaolin, feldspar, barytes, or the like, or a combination comprising at least one of the foregoing mineral fillers. Metal synergists, e.g., antimony oxide, can also be used with the flame retardant. In one example, the synergist may comprise magnesium hydroxide and phosphoric acid. The mineral filler may have an average particle size of about 0.1 to about 20 micrometers, specifically about 0.5 to about 10 micrometers, and more specifically about 1 to about 3 micrometers.

The thermoplastic composition can comprise an antioxidant. The antioxidants can include either a primary or a secondary antioxidant. For example, antioxidants can include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations including at least one of the foregoing antioxidants. Antioxidants can generally be used in amounts of from 0.01 to 0.5 parts by weight, based on 100 parts by weight of the total composition, excluding any filler.

In various aspects, the thermoplastic composition can comprise a mold release agent. Exemplary mold releasing agents can include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from about 0.1 to about 1.0 parts by weight, based on 100 parts by weight of the total composition, excluding any filler.

In an aspect, the thermoplastic composition can comprise a heat stabilizer. As an example, heat stabilizers can include, for example, organo phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations including at least one of the foregoing heat stabilizers. Heat stabilizers can generally be used in amounts of from 0.01 to 0.5 parts by weight based on 100 parts by weight of the total composition, excluding any filler.

In further aspects, light stabilizers can be present in the thermoplastic composition. Exemplary light stabilizers can include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers can generally be used in amounts of from about 0.1 to about 1.0 parts by weight, based on 100 parts by weight of the total composition, excluding any filler.

The thermoplastic composition can also comprise plasticizers. For example, plasticizers can include phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from about 0.5 to about 3.0 parts by weight, based on 100 parts by weight of the total composition, excluding any filler.

In further aspects, the disclosed composition can comprise antistatic agents. These antistatic agents can include, for example, glycerol monostearate, sodium stearyl sulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the composition electrostatically dissipative.

As one example, the composition comprises an electrically conductive carbon black. Electrically conductive carbon blacks are commercially available and are sold under a variety of trade names, including S.C.F. (Super Conductive Furnace), E.C.F. (Electric Conductive Furnace), Ketjen Black EC (available from Akzo Co., Ltd.), Monarch M900 from Cabot, or acetylene black. In some embodiments the electrically conductive carbon black has an average particle size less than or equal to 200 nanometers (nm), specifically less than or equal to 100 nm, more specifically less than or equal to 50 nm. The electrically conductive carbon black may also have surface areas greater than 200 square meters per gram ($m^2/g$), specifically greater than 400 $m^2/g$, more specifically, greater than 1,000 $m^2/g$. The electrically conductive carbon black may have a pore volume greater than or equal to 40 cubic centimeters per hundred grams ($cm^3$/100 g), specifically, greater than or equal to 100 $cm^3$/100 g, more specifically, greater than or equal to 150 $cm^3$/100 g, as determined by dibutyl phthalate absorption.

Ultraviolet (UV) absorbers can also be present in the disclosed thermoplastic composition. Exemplary ultraviolet absorbers can include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

The thermoplastic composition can further comprise a lubricant. As an example, lubricants can include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants can generally be used in amounts of from about 0.1 to about 5 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. In one example, TSAN can comprise 50 wt. % PTFE and 50 wt. % SAN, based on the total weight of the encapsulated fluoropolymer. The SAN can comprise, for example, 75 wt. % styrene and 25 wt. % acrylonitrile based on the total weight of the copolymer. An antidrip agent, such as TSAN, can be used in amounts of 0.1 to 10 parts by weight, based on 100 parts by weight of the total composition, excluding any filler.

In many aspects, the compositions can be prepared according to a variety of methods. The compositions of the present disclosure can be blended, compounded, or otherwise combined with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods can include, but is not limited to, co-rotating and counter-rotating extruders, single screw extruders, co-kneaders, disc-pack processors and various other types of extrusion equipment. In a further aspect, the extruder is a twin-screw extruder. In various further aspects, the composition can be processed in an extruder at temperatures from about 180° C. to about 350° C., particularly 250° C. to 300° C.

Properties and Articles

In various aspects, the thermoplastic compositions achieves both dielectric and mechanical performance that can be attributed to a synergy among its components. The thermoplastic composition can exhibit a dielectric constant of less than 3.0 at a frequency of 1.9 GHz when tested using a split post dielectric resonator and network analyzer on a sample size of 100 mm by 70 mm and 1.6 mm thickness. The thermoplastic composition can exhibit a dissipation factor Df of less than 0.01 at a frequency of 1.9 GHz when tested using a split post dielectric resonator and network analyzer on a sample size of 100 mm by 70 mm and 1.6 mm thickness.

In addition to certain dielectric properties, the thermoplastic composition can maintain certain physical and mechanical performance. The thermoplastic composition can exhibits a nano-molding technology bonding strength of at least 18 when tested in accordance with a bonding strength test adapted from ISO 19095 with a T treatment. In some examples, the thermoplastic composition can exhibit a bonding strength of greater than 23 according to the foregoing standard. The thermoplastic composition can exhibit notched impact strength of at least 70 joules per meter (J/m) when tested in accordance with ASTM D256 at 23° C. or at least 11 kilojoules per square meter ($kJ/m^2$) when tested in accordance with ISO 180/A. The thermoplastic composition can exhibit a flow rate of less than 25 $cm^3$/10 min when tested in accordance with ISO 1133 at 275° C. at 5 kg and 300 seconds. In further examples, the thermoplastic composition can exhibit a tensile modulus at break of greater than 80 MPa when tested in accordance with ISO 527.

In various aspects, the present disclosure relates to articles comprising the compositions herein. The compositions can be molded into useful shaped articles by a variety of means such as injection molding, extrusion, rotational molding, blow molding and thermoforming to form articles. The compositions can be useful in the manufacture of articles requiring materials with high modulus, good flow, good impact strength, thermal conductivity, and reflectivity.

The advantageous characteristics of the compositions disclosed herein can make them appropriate for an array of uses. Formed articles can include, but are not limited to, personal computers, notebook and portable computers, cell phone antennas and other such communications equipment, medical applications, RFID applications, automotive applications, and the like. In various further aspects, the article can be appropriate as a computer and business machine housing such as a housing for high end laptop personal computers, monitors, robotics, a hand held electronic device housing (such as a housing or flash holder for smart phones, tablets, music devices), electrical connectors, LED heat sink, and components of lighting fixtures, wearables, ornaments, home appliances, and the like.

In a further aspect, non-limiting examples of fields in which the thermoplastic compositions can be employed can include electrical, electro-mechanical, radio frequency (RF) technology, telecommunication, automotive, aviation, medical, sensor, military, and security. In a still further aspect, the thermoplastic compositions can also be present in overlapping fields, such as mechatronic systems that integrate mechanical and electrical properties which can, for example, be used in automotive or medical engineering.

In a further aspect, the suitable article can be an electronic device, automotive device, telecommunication device, medical device, security device, or mechatronic device. In a still further aspect, the article can be selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device, and radio frequency identification (RFID) device. In yet a further aspect, the article can be selected from a computer device, sensor device, security device, RF antenna device, LED device and RFID device.

In a further aspect, the molded articles can be used to manufacture devices in the automotive field. In a still further aspect, non-limiting examples of such devices in the automotive field which can use the disclosed blended thermoplastic compositions in the vehicle's interior include adaptive cruise control, headlight sensors, windshield wiper sensors, and door/window switches. In a further aspect, non-limiting examples of devices in the automotive field which can the disclosed blended thermoplastic compositions in the vehicle's exterior include pressure and flow sensors for engine management, air conditioning, crash detection, and exterior lighting fixtures.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as cellphone antennae and the like.

It is also to be understood that the terminology used herein is for describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims that follow, reference is made to a number of terms that shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additional additive materials" means that the additional additive materials can or cannot be substituted and that the description includes molded articles that both include and do not include additional additive materials.

As used herein, a "substantially similar reference composition" is a reference composition that includes the same components, and the same amounts of the components, as the claimed (or described) inventive composition, except that the reference composition does not include the recited component (e.g., a hollow glass fiber, a heat stabilizer, an acid stabilizer and/or a UV absorbing component). In other words, the reference composition is otherwise identical to the claimed/described composition but for the exclusion of the recited component(s). It will be recognized that where the recited component(s) is/are omitted from the reference composition, the omitted component(s) will be replaced with a corresponding content of the primary component of the composition (e.g. polymer base resin, polyester, polycarbonate, etc.). Thus, as shown in the Examples set forth below, if the described composition includes, e.g., 14 wt. % of a hollow glass fiber with the balance being polymer base resin and other additives, the content of the omitted components will be replaced with a corresponding amount of polymer base resin (e.g., an additional 14 wt. %) or in some examples, replaced with a non-hollow glass fiber.

As used herein, the term "effective amount" refers to an amount that is sufficient to achieve the desired modification of a physical property of the composition or material. For example, an "effective amount" of a heat stabilizer refers to an amount that is sufficient to achieve the desired improvement in the property modulated by the formulation component, e.g. achieving the desired level of UV absorbing component stability and/or color stability. The specific level in terms of wt. % in a composition required as an effective amount will depend upon a variety of factors including the amount and type of polycarbonate, amount and type of other components, and end use of the article made using the composition.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The terms "BisA," "BPA," or "bisphenol A," which can be used interchangeably, as used herein refers to a compound having a structure represented by the formula:

BisA can also be referred to by the name 4,4'-(propane-2,2-diyl)diphenol; p,p'-isopropylidenebisphenol; or 2,2-bis (4-hydroxyphenyl)propane. BisA has the CAS #80-05-7.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt. % values are based on the total weight of the composition. It should be understood that the sum of wt. % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art. It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

As used herein, "polybutylene terephthalate" can be used interchangeably with poly(1,4-butylene terephthalate). Polybutylene terephthalate refers to a type of polyester.

As used herein, "polyethylene terephthalate" can be used interchangeably with poly(ethyl benzene-1,4-dicarboxylate). As with polybutylene terephthalate, polyethylene terephthalate is a type of polyester.

As used herein, "polypropylene" can be used interchangeably with poly(propene). The term "polypropylene" as used in this application is meant to refer to propylene homopolymer or propylene copolymer or a mixture of such propylene homopolymers and propylene copolymers. Accordingly, the term "polypropylene homopolymer" as used in this application is meant to refer to a polypropylene that consists substantially, i.e. of 97% or more by weight of the polymer of propylene units, preferably 98% or more, more preferably 99% or more, even more preferably 99.5% or more. In one aspect, only propylene units in the propylene homopolymer are detectable. The comonomer content can be determined with Fourier Transform infrared spectroscopy.

Aspects

Aspect 1A. A thermoplastic composition comprising: from 15 wt. % to 80 wt. % of a polymer resin; and from 10 wt. % to 50 wt. % of a low dielectric constant glass fiber component, wherein the glass fiber component has a Dk of less than 5.0 at a frequency of from 1 MHz to 1 GHz and a Df of less than 0.002 at a frequency of from 1 MHz to 1 GHz; from 3 wt. % to 40 wt. % of a hollow filler; and from 0.1 wt. % to 10 wt. % of an impact modifier, wherein the thermoplastic composition exhibits a dielectric constant of less than 3.2 at a frequency of 1.9 GHz when tested using a split post dielectric resonator and network analyzer on a sample size of 100 mm by 70 mm and 1.6 mm thickness; wherein the thermoplastic composition exhibits a dissipation factor Df of less than 0.01 at a frequency of 1.9 GHz when tested using a split post dielectric resonator and network analyzer on a sample size of 100 mm by 70 mm and 1.6 mm thickness, wherein the thermoplastic composition exhibits a nano-molding technology bonding strength of at least 18 MPa when tested in accordance with a bonding strength test adapted from ISO 19095 with a T treatment, wherein the thermoplastic composition exhibits a notched impact strength of at least 70 J/m when tested in accordance with ASTM D256 at 23° C., wherein the thermoplastic composition exhibits a flow rate of less than 25 cm$^3$/10 min when tested in accordance with ISO 1133 at 275° C. at 5 kg and 300 seconds, and wherein the combined weight percent value of all components does not exceed 100 wt. %, and all weight percent values are based on the total weight of the composition.

Aspect 1B. A thermoplastic composition consisting essentially of: from 15 wt. % to 80 wt. % of a polymer resin; and from 10 wt. % to 50 wt. % of a low dielectric constant glass fiber component, wherein the glass fiber component has a Dk of less than 5.0 at a frequency of from 1 MHz to 1 GHz and a Df of less than 0.002 at a frequency of from 1 MHz to 1 GHz; from 3 wt. % to 40 wt. % of a hollow filler; and from 0.1 wt. % to 10 wt. % of an impact modifier, wherein the thermoplastic composition exhibits a dielectric constant of less than 3.0 at a frequency of 1.9 GHz when tested using a split post dielectric resonator and network analyzer on a sample size of 100 mm by 70 mm and 1.6 mm thickness; wherein the thermoplastic composition exhibits a dissipation factor Df of less than 0.01 at a frequency of 1.9 GHz when tested using a split post dielectric resonator and network analyzer on a sample size of 100 mm by 70 mm and 1.6 mm thickness, wherein the thermoplastic composition exhibits a nano-molding technology bonding strength of at least 18 MPa when tested in accordance with a bonding strength test adapted from ISO 19095 with a T treatment, wherein the thermoplastic composition exhibits a notched impact strength of at least 70 J/m when tested in accordance with ASTM D256 at 23° C., wherein the thermoplastic composition exhibits a flow rate of less than 25 cm3/10 min when tested in accordance with ISO 1133 at 275° C. at 5 kg and 300 seconds, and wherein the combined weight percent value of all components does not exceed 100 wt. %, and all weight percent values are based on the total weight of the composition.

Aspect 1C. A thermoplastic composition consisting of: from 15 wt. % to 80 wt. % of a polymer resin; and from 10 wt. % to 50 wt. % of a low dielectric constant glass fiber component, wherein the glass fiber component has a Dk of less than 5.0 at a frequency of from 1 MHz to 1 GHz and a Df of less than 0.002 at a frequency of from 1 MHz to 1 GHz; from 3 wt. % to 40 wt. % of a hollow filler; and from 0.1 wt. % to 10 wt. % of an impact modifier, wherein the thermoplastic composition exhibits a dielectric constant of less than 3.2 at a frequency of 1.9 GHz when tested using a split post dielectric resonator and network analyzer on a sample size of 100 mm by 70 mm and 1.6 mm thickness; wherein the thermoplastic composition exhibits a dissipation factor Df of less than 0.01 at a frequency of 1.9 GHz when tested using a split post dielectric resonator and network analyzer on a sample size of 100 mm by 70 mm and 1.6 mm thickness, wherein the thermoplastic composition exhibits a nano-molding technology bonding strength of at least 18 MPa when tested in accordance with a bonding strength test adapted from ISO 19095 with a T treatment, wherein the thermoplastic composition exhibits a notched impact strength of at least 70 J/m when tested in accordance with ASTM D256 at 23° C., wherein the thermoplastic composition exhibits a flow rate of less than 25 cm$^3$/10 min when tested in accordance with ISO 1133 at 275° C. at 5 kg and 300 seconds, and wherein the combined weight percent value of all components does not exceed 100 wt. %, and all weight percent values are based on the total weight of the composition.

Aspect 2. The thermoplastic composition of any of aspects 1A-1C, wherein the polymer base resin comprises a polyalkylene terephthalate, polyamide, polyetherketone, polyphthalamide, polyarylene ether, a polypropylene, a polystyrene, polysiloxane copolymer, or a combination thereof.

Aspect 3A. A thermoplastic composition comprising: from 15 wt. % to 80 wt. % of a polyalkylene terephthalate resin; and from 10 wt. % to 50 wt. % of a low dielectric constant (Dk)/low dissipation factor (DO glass fiber component; from 3 wt. % to 40 wt. % of a hollow filler; and from 0.1 wt. % to 10 wt. % of an impact modifier, wherein the low Dk/low Df glass fiber component has a Dk of less than 5.0 at a frequency of from 1 MHz to 1 GHz and a Df of less than 0.002 at a frequency of from 1 MHz to 1 GHz, wherein the thermoplastic composition exhibits a dielectric constant of less than 3.0 or less than 3.2 at a frequency of 1.9 GHz when tested using a split post dielectric resonator and network analyzer on a sample size of 100 mm by 70 mm and 1.6 mm thickness; wherein the thermoplastic composition exhibits a dissipation factor Df of less than 0.01 at a frequency of 1.9 GHz when tested using a split post dielectric resonator and network analyzer on a sample size of 100 mm by 70 mm and 1.6 mm thickness and wherein the combined weight percent value of all components does not exceed 100 wt. %, and all weight percent values are based on the total weight of the composition.

Aspect 3B. A thermoplastic composition consisting essentially of: from 15 wt. % to 80 wt. % of a polyalkylene terephthalate resin; and from 10 wt. % to 50 wt. % of a low dielectric constant (Dk)/low dissipation factor (DO glass fiber component; from 3 wt. % to 40 wt. % of a hollow filler; and from 0.1 wt. % to 10 wt. % of an impact modifier, wherein the low Dk/low Df glass fiber component has a Dk of less than 5.0 at a frequency of from 1 MHz to 1 GHz and a Df of less than 0.002 at a frequency of from 1 MHz to 1 GHz, wherein the thermoplastic composition exhibits a dielectric constant of less than 3.2 at a frequency of 1.9 GHz when tested using a split post dielectric resonator and network analyzer on a sample size of 100 mm by 70 mm and 1.6 mm thickness; wherein the thermoplastic composition exhibits a dissipation factor Df of less than 0.01 at a frequency of 1.9 GHz when tested using a split post dielectric resonator and network analyzer on a sample size of 100 mm by 70 mm and 1.6 mm thickness and wherein the combined weight percent value of all components does not exceed 100 wt. %, and all weight percent values are based on the total weight of the composition.

Aspect 3C. A thermoplastic composition consisting of: from 15 wt. % to 80 wt. % of a polyalkylene terephthalate resin; and from 10 wt. % to 50 wt. % of a low dielectric constant (Dk)/low dissipation factor (DO glass fiber component; from 3 wt. % to 40 wt. % of a hollow filler; and from 0.1 wt. % to 10 wt. % of an impact modifier, wherein the low Dk/low Df glass fiber component has a Dk of less than 5.0 at a frequency of from 1 MHz to 1 GHz and a Df of less than 0.002 at a frequency of from 1 MHz to 1 GHz, wherein the thermoplastic composition exhibits a dielectric constant of less than 3.2 at a frequency of 1.9 GHz when tested using a split post dielectric resonator and network analyzer on a sample size of 100 mm by 70 mm and 1.6 mm thickness; wherein the thermoplastic composition exhibits a dissipation factor Df of less than 0.01 at a frequency of 1.9 GHz when tested using a split post dielectric resonator and network analyzer on a sample size of 100 mm by 70 mm and 1.6 mm thickness and wherein the combined weight percent value of all components does not exceed 100 wt. %, and all weight percent values are based on the total weight of the composition.

Aspect 4. The thermoplastic composition of any one of aspects 1A-3C, wherein the thermoplastic composition exhibits a dissipation factor at a frequency of 1.9 GHz that is less than that of a substantially similar polymer composition in the absence of the hollow filler when tested using a split post dielectric resonator and network analyzer on a sample size of 100 mm by 70 mm and 1.6 mm thickness.

Aspect 5. The thermoplastic composition according to any one of aspects 1A-4, wherein the low Dk/low Df glass fiber component has a Df of less than 0.001 at a frequency of from 1 MHz to 1 GHz.

Aspect 6. The thermoplastic composition according to any one of aspects 1A-5, wherein the thermoplastic composition comprises a Dk that is 3% to 12% lower than a substantially similar reference composition in the absence of a hollow filler component when tested using a split post dielectric resonator and network analyzer on a sample size of 100 mm by 70 mm and 1.6 mm thickness.

Aspect 7. The thermoplastic composition according to any one of aspects 3A-6, wherein the thermoplastic composition exhibits a nano-molding technology bonding strength of at least 18 MPa when tested in accordance with a bonding strength test adapted from ISO 19095 with a T treatment.

Aspect 8. The thermoplastic composition according to any one of aspects 3A-6, wherein the thermoplastic composition exhibits a notched impact strength of at least 70 J/m when tested in accordance with ASTM D256 at 23° C.

Aspect 9. The thermoplastic composition according to any one of aspects 3A-6, wherein the thermoplastic composition exhibits a flow rate of less than 25 cm³/10 min when tested in accordance with ISO 1133 at 275° C. at 5 kg and 300 seconds.

Aspect 10. The thermoplastic composition of any one of aspects 1A-9, wherein the impact modifier comprises a styrene based copolymer.

Aspect 11. The thermoplastic composition according to any one of aspects 1A-9, wherein the impact modifier is a styrene and ethylene/butylene (SEBS) copolymer, a polyester ether elastomer/ethylene-ethylacrylate copolymer, or a combination thereof.

Aspect 12. The thermoplastic composition of any one of aspects 1A-9, wherein the impact modifier comprises a styrene based copolymer selected from the group consisting of styrene ethylene butylene styrene copolymer (SEBS), styrene butadiene styrene (SBS), styrene ethylene propylene styrene (SEPS) and combinations thereof.

Aspect 13. The thermoplastic composition of any one of aspects 1A-10, wherein the thermoplastic composition further comprises a low Dk polymer resin wherein the low Dk polymer resin exhibits a Dk of less than 2.8.

Aspect 14. The thermoplastic composition of any of aspects 1A-11, wherein the thermoplastic composition further comprises an additive.

Aspect 15. The thermoplastic composition of aspect 14, wherein the additive comprises a pigment, a dye, a filler, a plasticizer, a fiber, a flame retardant, an antioxidant, a lubricant, an anti-ultraviolet agent, an anti-static agent, an anti-microbial agent, a compatibilizer, or a combination thereof.

Aspect 16. The thermoplastic composition of any of aspects 1A-15, wherein the polymer base resin further comprises a polycarbonate-polysiloxane copolymer.

Aspect 17. An article comprising the thermoplastic composition of any of aspects 1A-16.

Aspect 18. The article of aspect 17, wherein the article is a component of an antenna for an electronic device.

Aspect 19A. A method for making a thermoplastic article, comprising: mixing, in any order: from 15 wt. % to 80 wt. % of a polyalkylene terephthalate resin; and from 10 wt. % to 50 wt. % of a low dielectric constant (Dk)/low dissipation factor (Df) glass fiber component; from 3 wt. % to 40 wt. % of a hollow filler; and from 0.1 wt. % to 10 wt. % of an impact modifier so as to form a blend; and injection molding, extruding, rotational molding, blow molding, or thermoforming the blend to form the thermoplastic article.

Aspect 19B. A method for making a thermoplastic article, the method consisting essentially of: mixing, in any order: from 15 wt. % to 80 wt. % of a polyalkylene terephthalate resin; and from 10 wt. % to 50 wt. % of a low dielectric constant (Dk)/low dissipation factor (Df) glass fiber component; from 3 wt. % to 40 wt. % of a hollow filler; and from 0.1 wt. % to 10 wt. % of an impact modifier so as to form a blend; and injection molding, extruding, rotational molding, blow molding, or thermoforming the blend to form the thermoplastic article.

Aspect 19C. A method for making a thermoplastic article, the method consisting of: mixing, in any order: from 15 wt. % to 80 wt. % of a polyalkylene terephthalate resin; and from 10 wt. % to 50 wt. % of a low dielectric constant (Dk)/low dissipation factor (Df) glass fiber component; from 3 wt. % to 40 wt. % of a hollow filler; and from 0.1 wt. % to 10 wt. % of an impact modifier so as to form a blend; and injection molding, extruding, rotational molding, blow molding, or thermoforming the blend to form the thermoplastic article.

Aspect 20. The method according to any of aspects 19A-19C, wherein the thermoplastic article comprises an antenna, an antenna component, or a radio frequency component.

Aspect 21. The method according to any of aspects 19A-C or 20, wherein the low Dk/low Df glass fiber component has a Df of less than about 0.001 at a frequency of from 1 MHz to 1 GHz.

Aspect 22. The method according to any one of aspects 19A-21, wherein the blend has a Dk less than 3.0 and a Df less than 0.01 at a frequency of 1.9 GHz when tested using a split post dielectric resonator and network analyzer.

Aspect 23. The method according to any one of aspects 19A-22, wherein the impact modifier is a styrene and ethylene/butylene (SEBS) copolymer, a polyester ether elastomer/ethylene-ethylacrylate copolymer, or a combination thereof.

Aspect 24. The method according to any one of aspects 19A-23, wherein the thermoplastic article comprises a Dk that is less than the Dk for a substantially similar reference article in the absence of a hollow filler component.

Examples

Detailed embodiments of the present disclosure are disclosed herein; it is to be understood that the disclosed embodiments are merely exemplary of the disclosure that may be embodied in various forms. Therefore, specific structural and functional details disclosed herein are not to be interpreted as limits, but merely as a basis for teaching one skilled in the art to employ the present disclosure. The specific examples below will enable the disclosure to be better understood. However, they are given merely by way of guidance and do not imply any limitation.

The following examples are provided to illustrate the compositions, processes, and properties of the present disclosure. The examples are merely illustrative and are not intended to limit the disclosure to the materials, conditions, or process parameters set forth therein.

General Materials and Methods

Materials are presented in Table 1 (FIG. 1). The components and additives presented in Table 1 were used to prepare compositions according to aspects of the present disclosure and examples to be used for comparison to molded articles according to aspects of the disclosure. Tables 2A and 2B present the formulations for samples C1-Ex29 and are presented in FIGS. 2 and 3. Formulations were prepared by extruding the pre-blended components using a twin extruder. The components were dry blended together, then fed into an extruder. The extrudate was cooled using a water bath prior to pelletizing. Components were compounded using a length to diameter (L/D) at 40.5 Toshiba™ TEM-37BS co-rotating twin screw extruder with extrusion settings presented in Table 3. In Table 3, screw speed rpm are revolutions per minute and throughput kg/hr are kilograms per hour.

TABLE 3

Extrusion Conditions.

| Parameters | Unit | Extrusion Condition |
|---|---|---|
| Compounder Type | NONE | TEM-37BS |
| Barrel Size | mm | 1500 |
| Die diameter | mm | 4 |
| Zone 1 Temp | ° C. | 100 |
| Zone 2 Temp | ° C. | 200 |
| Zone 3 Temp | ° C. | 260 |
| Zone 4 ~ 11 Temp | ° C. | 260-270 |
| Die Temp | ° C. | 260 |
| Screw speed | rpm | 200 |
| Throughput | kg/hr | 50 |

The pellets obtained from extrusion were then injection molded. The injection molding profile is presented in Table 4. In Table 4, injection speed mm/s are millimeters per second; holding pressure kgf/cm$^2$ are kilogram-force per square centimeter.

TABLE 4

Injection molding profile.

| Parameters | Unit | Molding Condition |
|---|---|---|
| Cnd: Pre-drying time | Hour | 4 |
| Cud: Pre-drying temp | ° C. | 120 |
| Zone 1 temp | ° C. | 250 |
| Zone 2 temp | ° C. | 260 |
| Zone 3 temp | ° C. | 270 |
| Nozzle temp | ° C. | 270 |
| Mold temp | ° C. | 100 |
| Injection speed | mm/s | 50 |
| Holding pressure | kgf/cm$^2$ | 700 |
| Max. Injection pressure | kgf/cm$^2$ | 800 |

Molded samples were tested in accordance with the standards described herein. Comparative samples C1-C9 were prepared to assess the performance of formulations comprising the polymer base resin in the absence of the hollow glass sphere. Further derivations are illustrated in inventive samples Ex10 through Ex29.

Properties of the compositions are presented in Tables 5A and 5B, in FIGS. 4 and 5, respectively.

The dielectric constant and dissipation factor were determined using the SABIC Method on a QWED split post dielectric resonator and Agilent PNA network analyzer. For 1.1 GHz measurement, minimum sample size is 100 mm by 70 mm, maximum sample thickness is 6 mm. For 1.9 GHz measurement, minimum sample size is 100 mm by 70 mm, maximum sample thickness is 4 mm.

Figure 5B:
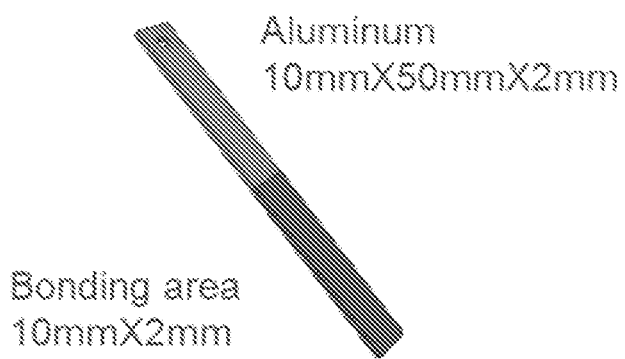
FIG. 5B is a diagram of a top butt joint injection molding part according to aspects of the disclosure.

Bonding strength was determined based on a variation of ISO 19095 for "Evaluation of the adhesion interface performance in plastic-metal assemblies." The adapted method was as follows: 1) pre-treatment on the metal parts (aluminum insets) to create nano- and micro-sized holes on metal surface by chemical etching process; 2) Within effective treatment timeframe, plastic was injection-molded onto the pre-treated aluminum insets; 3) Bonding force was measured on a standard tensile test machine by recording the force when the molded parts are pulled until the breaking point; and 3) bonding strength was calculated in units of MPa using bonding force divided by bonding area. FIGS. 5A and 5B provide diagrams of injection molding part for bonding strength. FIG. 5A is the top lap joint and FIG. 5B shows the top butt joint.

Testing standards and conditions for the various properties observed are summarized in Table 6. Samples included low and high viscosity PBT to establish a balance among ease of manufacturing, impact strength, and flow properties. Low viscosity can provide ease of is while high viscosity can improve impact strength. Comparative samples C1 and C2 (also including low intrinsic viscosity PET) demonstrate that introducing a low Dk glass fiber to the PBT resin can decrease the Dk of PBT compounds. C3 and C4 introduce a different PET (PCR PET) without substantial change to the Dk and Df, but flow rate decreased with the PCR PET rather than in the absence of PET. C5 through C9 focus on the presence of PCR PET with different low Dk polymers (GPPS, PP, PTFE, etc) and introduce impact modifiers. Although PTFE has a lower Dk value than polypropylene, the PBT-PTFE samples show higher Dk values than PBT-PP samples (see, C6 vs. C7). Moreover, the low Dk polymer resins appeared to lower the bonding strength across observed samples (C5-C9).

Inventive samples Ex10 through Ex12 introduce a hollow glass sphere as a fiber filler. It was found that the hollow glass sphere significantly decreased the Dk value of the PBT resins, but the Izod impact strength and HDT suffered (see, Ex10 and Ex12). Ex13 through Ex17 introduce an impact modifier and change characteristics of the hollow glass fiber (Ex15). The combination of low Dk glass fiber, hollow glass spheres, and an impact modifier improved the unnotched Izod impact and HDT with a relatively low Dk. However, the notched Izod impact strength was still somewhat low (i.e., less than 10 kJ/m$^2$). And, both notched and unnotched Izod impact strength were low compared to C1 through C4.

Ex18 and 19 alter the amount of low Dk glass fiber as well as the amount of hollow glass spheres. Ex19, having 50 wt. % low Dk glass fiber would be expected to have a lower Dk/Df than Ex18. However, Ex19 exhibited a much higher Dk. PBT generally has a Dk of about 3, while low Dk/Df glass fiber has a Dk of about 4.5. Hollow glass sphere has a Dk of about 1.2-2.0. Still, Ex18 exhibited a very high flow rate, which may be less desirable.

Ex20 through Ex29 demonstrate the effects of different polymer base resin and the different type of hollow glass spheres. Among these samples, Ex29 exhibited a balanced combination of properties in that the sample exhibited a moderate flow rate, a notched impact strength greater than 12 kJ/m$^2$, a bonding strength greater than 20, and a Dk less than 2.9.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

While typical aspects have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A thermoplastic composition comprising:
   from 15 wt. % to 80 wt. % of a polymer resin; and
   from 10 wt. % to 50 wt. % of a low dielectric constant glass fiber component, wherein the glass fiber component has a Dk of less than 5.0 at a frequency of from 1 MHz to 1 GHz and a Df of less than 0.002 at a frequency of from 1 MHz to 1 GHz;
   from 3 wt. % to 40 wt. % of a hollow filler; and
   from 0.1 wt. % to 10 wt. % of an impact modifier,
   wherein the thermoplastic composition exhibits a dielectric constant of less than 3.2 at a frequency of 1.9 GHz when tested using a split post dielectric resonator and network analyzer on a sample size of 100 mm by 70 mm and 1.6 mm thickness;
   wherein the thermoplastic composition exhibits a dissipation factor Df of less than 0.01 at a frequency of 1.9 GHz when tested using a split post dielectric resonator and network analyzer on a sample size of 100 mm by 70 mm and 1.6 mm thickness,
   wherein the thermoplastic composition exhibits a nanomolding technology bonding strength of at least 18 MPa when tested in accordance with a bonding strength test adapted from ISO 19095 with a T treatment,
   wherein the thermoplastic composition exhibits a notched impact strength of at least 70 J/m when tested in accordance with ASTM D256 at 23° C.,
   wherein the thermoplastic composition exhibits a flow rate of less than 25 cm³/10 min when tested in accordance with ISO 1133 at 275° C. at 5 kg and 300 seconds, and
   wherein the combined weight percent value of all components does not exceed 100 wt. %, and all weight percent values are based on the total weight of the composition.

2. The thermoplastic composition of claim 1, wherein the polymer resin is selected from the group consisting of a polyalkylene terephthalate, polyamide, polyetherketone, polyphthalamide, polyarylene ether, a polypropylene, a polystyrene, polysiloxane copolymer, and a combination thereof.

3. A thermoplastic composition comprising:
   from 15 wt. % to 80 wt. % of a polyalkylene terephthalate resin; and
   from 10 wt. % to 50 wt. % of a low dielectric constant (Dk)/low dissipation factor (Df) glass fiber component;
   from 3 wt. % to 40 wt. % of a hollow filler; and
   from 0.1 wt. % to 10 wt. % of an impact modifier,
   wherein the low Dk/low Df glass fiber component has a Dk of less than 5.0 at a frequency of from 1 MHz to 1 GHz and a Df of less than 0.002 at a frequency of from 1 MHz to 1 GHz,
   wherein the thermoplastic composition exhibits a dielectric constant of less than 3.2 at a frequency of 1.9 GHz when tested using a split post dielectric resonator and network analyzer on a sample size of 100 mm by 70 mm and 1.6 mm thickness;
   wherein the thermoplastic composition exhibits a dissipation factor Df of less than 0.01 at a frequency of 1.9 GHz when tested using a split post dielectric resonator and network analyzer on a sample size of 100 mm by 70 mm and 1.6 mm thickness and
   wherein the combined weight percent value of all components does not exceed 100 wt. %, and all weight percent values are based on the total weight of the composition.

4. The thermoplastic composition according to claim 1, wherein the low Dk/low Df glass fiber component has a Df of less than 0.001 at a frequency of from 1 MHz to 1 GHz.

5. The thermoplastic composition according to claim 3, wherein the thermoplastic composition exhibits a nanomolding technology bonding strength of at least 18 MPa when tested in accordance with a bonding strength test adapted from ISO 19095 with a T treatment.

6. The thermoplastic composition according to claim 3, wherein the thermoplastic composition exhibits a notched impact strength of at least 70 J/m when tested in accordance with ASTM D256 at 23° C.

7. The thermoplastic composition according to claim 3, wherein the thermoplastic composition exhibits a flow rate of less than 25 cm³/10 min when tested in accordance with ISO 1133 at 275° C. at 5 kg and 300 seconds.

8. The thermoplastic composition of claim 1, wherein the impact modifier comprises a styrene based copolymer.

9. The thermoplastic composition according to claim 1, wherein the impact modifier is a styrene and ethylene/butylene (SEBS) copolymer, a polyester ether elastomer/ethylene-ethylacrylate copolymer, or a combination thereof.

10. The thermoplastic composition of claim 1, wherein the impact modifier comprises a styrene based copolymer selected from the group consisting of styrene ethylene butylene styrene copolymer (SEBS), styrene butadiene styrene (SBS), styrene ethylene propylene styrene (SEPS) and combinations thereof.

11. The thermoplastic composition of claim 1, wherein the thermoplastic composition further comprises a low Dk polymer resin wherein the low Dk polymer resin exhibits a Dk of less than 2.8.

12. The thermoplastic composition of claim 1, wherein the thermoplastic composition further comprises an additive.

13. The thermoplastic composition of claim 12, wherein the additive is selected from the group consisting of a pigment, a dye, a filler, a plasticizer, a fiber, a flame retardant, an antioxidant, a lubricant, an anti-ultraviolet agent, an anti-static agent, an anti-microbial agent, a compatibilizer, and a combination thereof.

14. The thermoplastic composition of claim 1, wherein the polymer base resin further comprises a polycarbonate-polysiloxane copolymer.

15. An article comprising the thermoplastic composition of claim 1.

16. The article of claim 15, wherein the article is a component of an antenna for an electronic device.

17. A method for making the thermoplastic article of claim 15, comprising:
  a) mixing, in any order:
    i. from 15 wt. % to 80 wt. % of a polyalkylene terephthalate resin; and
    ii. from 10 wt. % to 50 wt. % of a low dielectric constant (Dk)/low dissipation factor (Df) glass fiber component;
    iii. from 3 wt. % to 40 wt. % of a hollow filler; and
    iv. from 0.1 wt. % to 10 wt. % of an impact modifier so as to form a blend; and
  b) injection molding, extruding, rotational molding, blow molding, or thermoforming the blend to form the thermoplastic article.

18. The method according to claim 17, wherein the thermoplastic article comprises an antenna, an antenna component, or a radio frequency component.

* * * * *